United States Patent
Lee et al.

(10) Patent No.: US 9,577,806 B2
(45) Date of Patent: *Feb. 21, 2017

(54) METHOD AND APPARATUS FOR TRANSMITTING DOWNLINK REFERENCE SIGNAL IN WIRELESS COMMUNICATION SYSTEM SUPPORTING MULTIPLE ANTENNAS

(71) Applicant: LG ELECTRONICS INC., Seoul (KR)

(72) Inventors: Dae Won Lee, Anyang-Si (KR); Hak Seong Kim, Anyang-Si (KR); Byoung-Hoon Kim, Anyang-Si (KR); Ki Jun Kim, Anyang-Si (KR); Eun Sun Kim, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,423

(22) Filed: Apr. 14, 2016

(65) Prior Publication Data

US 2016/0233997 A1 Aug. 11, 2016

Related U.S. Application Data

(63) Continuation of application No. 13/932,895, filed on Jul. 1, 2013, now Pat. No. 9,345,034, which is a
(Continued)

(30) Foreign Application Priority Data

Oct. 26, 2010 (KR) ........................ 10-2010-0104630

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0413* (2013.01); *H04B 7/066* (2013.01);
(Continued)

(58) Field of Classification Search
CPC .... H04L 5/0048; H04L 5/0023; H04L 5/0053
See application file for complete search history.

(56) References Cited

U.S. PATENT DOCUMENTS 8,174,957 B2 5/2012 Ko et al.
8,254,329 B2 8/2012 Ko et al.
(Continued)

FOREIGN PATENT DOCUMENTS

RU 2371850 C1 10/2009
WO WO 2005/018270 A2 2/2005
WO WO 2011/044530 A2 4/2011

OTHER PUBLICATIONS

Nokia et al., "Intra-cell CSI-RS design aspects," 3GPP TSG-RAN WG1 Meeting #59, Jeju, Korea, R1-094647, Nov. 9-13, 2009, 7 pages.

*Primary Examiner* — Ross Varndell
(74) *Attorney, Agent, or Firm* — Birch, Stewart, Kolasch & Birch, LLP

(57) ABSTRACT

A method and apparatus for transmitting a downlink reference signal in a wireless communication system supporting multiple antennas are discussed. A method for transmitting Channel State Information-Reference Signals (CSI-RSs) for eight or less antenna ports includes selecting one of a plurality of CSI-RS Resource Element (RE) groups defined on a data region of a downlink subframe and mapping CSI-RSs for the eight or less antenna ports to the selected CSI-RS RE group, and transmitting the downlink subframe in which the CSI-RSs for the eight or less antenna ports are mapped.

14 Claims, 36 Drawing Sheets

Related U.S. Application Data continuation of application No. 13/006,879, filed on Jan. 14, 2011, now Pat. No. 8,494,006.

(60) Provisional application No. 61/302,166, filed on Feb. 7, 2010, provisional application No. 61/309,390, filed on Mar. 1, 2010.

(51) Int. Cl.
*H04W 72/04* (2009.01)
*H04W 72/08* (2009.01)
*H04B 7/04* (2006.01)
*H04W 24/02* (2009.01)

(52) U.S. Cl.
CPC ......... *H04B 7/0626* (2013.01); *H04L 5/0007* (2013.01); *H04L 5/0023* (2013.01); *H04L 5/0051* (2013.01); *H04W 72/042* (2013.01); *H04W 72/08* (2013.01); *H04W 24/02* (2013.01)

(56) References Cited

U.S. PATENT DOCUMENTS

| Patent/Pub. No. | | Date | Inventor | Classification |
|---|---|---|---|---|
| 8,494,006 | B2 * | 7/2013 | Lee | H04B 7/0626 370/203 |
| 9,306,717 | B2 * | 4/2016 | Ko | H04B 7/0413 |
| 2007/0248113 | A1 | 10/2007 | Ko et al. | |
| 2009/0110038 | A1 | 4/2009 | Montoyo et al. | |
| 2009/0280538 | A1 | 11/2009 | Kim et al. | |
| 2009/0290538 | A1 | 11/2009 | Kim et al. | |
| 2010/0246376 | A1 | 9/2010 | Nam et al. | |
| 2010/0254471 | A1 | 10/2010 | Ko et al. | |
| 2011/0032839 | A1 | 2/2011 | Chen et al. | |
| 2011/0141987 | A1 | 6/2011 | Nam et al. | |
| 2011/0170498 | A1 | 7/2011 | Liu et al. | |
| 2011/0244877 | A1 * | 10/2011 | Farajidana | H04L 5/0023 455/452.2 |
| 2012/0020230 | A1 | 1/2012 | Chent et al. | |
| 2012/0058791 | A1 | 3/2012 | Bhattad et al. | |
| 2013/0258976 | A1 | 10/2013 | Nagata et al. | |

\* cited by examiner (a)

(b)

Control Region
CRS for 4 Transmission Antennas
DMRS ( Layer 1, 2, 5, 7 )
DMRS ( Layer 3, 4, 6, 8 )

- Control Region
- CRS for 4 Transmission Antennas
- DMRS ( Layer 1, 2, 5, 7 )
- DMRS ( Layer 3, 4, 6, 8 )
- CSI - RS RE Group ☐ Control Region
𝒞 CRS for 4 Transmission Antennas
▨ DMRS ( Layer 1, 2, 5, 7 )
▦ DMRS ( Layer 3, 4, 6, 8 )
☐ CSI - RS RE Group

- Control Region
- CRS for 4 Transmission Antennas
- DMRS ( Layer 1, 2, 5, 7 )
- DMRS ( Layer 3, 4, 6, 8 )
- CSI - RS RE Group

- Control Region
- CRS for 4 Transmission Antennas
- DMRS ( Layer 1, 2, 5, 7 )
- DMRS ( Layer 3, 4, 6, 8 )
- CSI - RS RE Group Control Region
CRS for 4 Transmission Antennas
DMRS ( Layer 1, 2, 5, 7 )
DMRS ( Layer 3, 4, 6, 8 )
CSI - RS RE Group ▦ Control Region
ℂ CRS for 4 Transmission Antennas
▨ DMRS ( Layer 1, 2, 5, 7 )
▦ DMRS ( Layer 3, 4, 6, 8 )
☐ CSI - RS RE Group Control Region
CRS for 4 Transmission Antennas
DMRS ( Layer 1, 2, 5, 7 )
DMRS ( Layer 3, 4, 6, 8 )
CSI-RS RE Group For 8 CSI-RSs (a)

(b)

▨ Control Region
𝒞 CRS for 4 Transmission Antennas
▨ DMRS ( Layer 1, 2, 5, 7 )
▨ DMRS ( Layer 3, 4, 6, 8 )
☐ CSI-RS RE Group For 4 CSI-RSs (a)

(b)

One CSI-RS RE Group

- Control Region
- CRS for 4 Transmission Antennas
- DMRS ( Layer 1, 2, 5, 7 )
- DMRS ( Layer 3, 4, 6, 8 )
- CSI-RS RE Group For 4 CSI-RSs

METHOD AND APPARATUS FOR TRANSMITTING DOWNLINK REFERENCE SIGNAL IN WIRELESS COMMUNICATION SYSTEM SUPPORTING MULTIPLE ANTENNAS

This application is a continuation of co-pending U.S. application Ser. No. 13/932,895, filed on Jul. 1, 2013, which is a continuation of U.S. application Ser. No. 13/006,879, filed on Jan. 14, 2011 (now U.S. Pat. No. 8,494,006 issued on Jul. 23, 2013), which claims benefit of U.S. provisional Patent Application Nos. 61/302,166, filed on Feb. 7, 2010, and 61/309,390, filed on Mar. 1, 2010, and which claims the benefit of Korean Patent Application No. 10-2010-0104630, filed on Oct. 26, 2010. All of these applications are hereby incorporated by reference as if fully set forth herein.

BACKGROUND OF THE INVENTION

Field of the Invention

The present invention relates to a wireless communication system, and more particularly, to a method and an apparatus for transmitting a downlink reference signal in a wireless communication system supporting multiple antennas.

Discussion of the Related Art

A Multiple Input Multiple Output (MIMO) system refers to a system for improving data transmission/reception efficiency using multiple transmission antennas and multiple reception antennas. MIMO technology includes a spatial diversity scheme and a spatial multiplexing scheme. The spatial diversity scheme is suitable for data transmission of a user equipment (UE) which moves at a high speed, because transmission reliability is increased or a cell radius is increased through diversity gain. The spatial multiplexing scheme can increase data transfer rate without increasing system bandwidth by simultaneously transmitting different data.

In a MIMO system, each transmission antenna has an independent data channel. The transmission antenna may be a virtual antenna or a physical antenna. A receiver estimates a channel with respect to each transmission antenna and receives data transmitted from each transmission antenna. Channel estimation refers to a process of compensating for signal distortion due to fading so as to restore the received signal. Fading refers to a phenomenon in which the intensity of a signal is rapidly changed due to multi-path and time delay in a wireless communication system environment. For channel estimation, a reference signal known to both a transmitter and a receiver is necessary. The reference signal may be abbreviated to RS or referred to as a pilot signal according to the standard.

A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may be referred to as a UE-specific reference signal or a Demodulation Reference Signal (DMRS).

In a system having an antenna configuration (e.g., a system according to the LTE-A standard supporting eight transmission antennas) developed as an extension of a legacy communication system (e.g., a system based on LTE release 8 or 9 standard) supporting four transmission antennas, DMRS-based data demodulation has been considered in order to support efficient reference signal management and develop a transmission scheme. That is, in order to support data transmission through extended antennas, DMRSs for two or more layers may be defined. Since the DMRSs are precoded using the same precoder as data, it is possible to easily estimate channel information for demodulating data at a reception side without separate precoding information.

A downlink reception side may acquire precoded channel information with respect to the extended antenna configuration through DMRSs. However, in order to acquire non-precoded channel information, separate reference signals are required in addition to the DMRSs. In a system based on the LTE-A standard, reference signals for acquiring Channel State Information (CSI) at a reception side, that is, CSI-RSs, may be defined.

SUMMARY OF THE INVENTION

Accordingly, the present invention is directed to a method and apparatus for transmitting a downlink reference signal in a wireless communication system supporting multiple antennas that substantially obviates one or more problems due to limitations and disadvantages of the related art.

An object of the present invention is to provide a method and apparatus for transmitting Channel State Information-Reference Signals (CSI-RSs) on a downlink Resource Element (RE) so as to efficiently perform channel estimation at a downlink reception side in Multiple Input Multiple Output (MIME)) transmission.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting Channel State Information-Reference Signals (CSI-RSs) for eight or less antenna ports includes selecting one of a plurality of CSI-RS Resource Element (RE) groups defined on a data region of a downlink subframe and mapping CSI-RSs for the eight or less antenna ports to the selected CSI-RS RE group; and transmitting the downlink subframe in which the CSI-RSs for the eight or less antenna ports are mapped, wherein the plurality of CSI-RS RE groups is defined such that a transmission diversity RE pair for data transmitted on the downlink subframe is not broken.

The downlink subframe may have a normal Cyclic Prefix (CP) configuration, the number of CSI-RS RE groups to which the CSI-RSs for eight antenna ports are mapped may be five within one Resource Block (RB), and one CSI-RS RE group may be defined at two contiguous subcarrier locations of two contiguous Orthogonal Frequency Division Multiplexing (OFDM) symbols and another two different contiguous subcarriers separated from the two contiguous subcarrier locations by four subcarriers, on resource elements in which Common Reference Signals (CRSs) and Demodulation Reference Signal (DMRSs) are not arranged.

The plurality of CSI-RS RE groups to which CSI-RSs for two antenna ports are mapped or the plurality of CSI-RS RE groups to which CSI-RSs for four antenna ports are mapped may be defined as a subset of the plurality of CSI-RS RE groups to which the CSI-RSs for the eight antennas are mapped.

Five CSI-RS RE groups to which the CSI-RSs for the eight antenna ports are mapped within one RB may include a first CSI-RS RE group of third, fourth, ninth and tenth subcarriers at sixth and seventh OFDM symbols, a second CSI-RS RE group of first, second, seventh and eighth subcarriers at tenth and eleventh OFDM symbols, a third CSI-RS RE group of third, fourth, ninth and tenth subcarriers at tenth and eleventh OFDM symbols, a fourth CSI-RS RE group of fifth, sixth, eleventh and twelfth subcarriers at tenth and eleventh OFDM symbols, and a fifth CSI-RS RE group of third, fourth, ninth and tenth subcarriers at thirteenth and fourteenth OFDM symbols.

The plurality of CSI-RS RE groups are defined as RE locations of one CSI-RS RE group are shifted in time and frequency domains with respect to another CSI-RS RE group.

CSI-RSs for two antenna ports among the CSI-RSs for the eight or less antenna ports may be multiplexed using a Code Division Multiplexing (CDM) scheme using orthogonal codes of a length of 2 over two contiguous OFDM symbols on the same subcarrier.

In another downlink subframe different from the downlink subframe, the CSI-RSs for the eight or less antenna ports may be mapped to another CSI-RS RE group excluding one CSI-RS RE group selected from the plurality of CSI-RS RE groups for the downlink subframe.

In another aspect of the present invention, a method for measuring channel information from Channel State Information-Reference Signals (CSI-RSs) for eight or less antenna ports includes receiving a downlink subframe in which the CSI-RSs for the eight or less antenna ports are mapped to one CSI-RS RE group selected from a plurality of CSI-RS RE groups defined on a data region of the downlink subframe; and measuring the channel information of each of the antenna ports using the CSI-RSs for the eight or less antenna ports, wherein the plurality of CSI-RS RE groups is defined such that a transmission diversity RE pair for data transmitted on the downlink subframe is not broken.

The downlink subframe may have a normal Cyclic Prefix (CP) configuration, the number of CSI-RS RE groups to which the CSI-RSs for eight antenna ports are mapped may be five within one Resource Block (RB), and one CSI-RS RE group may be defined at two contiguous subcarrier locations of two contiguous Orthogonal Frequency Division Multiplexing (OFDM) symbols and another two different contiguous subcarriers separated from the two contiguous subcarrier locations by four subcarriers, on resource elements in which Common Reference Signals (CRSs) and Demodulation Reference Signal (DMRSs) are not arranged.

The plurality of CSI-RS RE groups to which CSI-RSs for two antenna ports are mapped or the plurality of CSI-RS RE groups to which CSI-RSs for four antenna ports are mapped may be defined as a subset of the plurality of CSI-RS RE groups to which the CSI-RSs for the eight antennas are mapped.

Five CSI-RS RE groups to which the CSI-RSs for the eight antenna ports are mapped within one RB may include a first CSI-RS RE group of third, fourth, ninth and tenth subcarriers at sixth and seventh OFDM symbols, a second CSI-RS RE group of first, second, seventh and eighth subcarriers at tenth and eleventh OFDM symbols, a third CSI-RS RE group of third, fourth, ninth and tenth subcarriers at tenth and eleventh OFDM symbols, a fourth CSI-RS RE group of fifth, sixth, eleventh and twelfth subcarriers at tenth and eleventh OFDM symbols, and a fifth CSI-RS RE group of third, fourth, ninth and tenth subcarriers at thirteenth and fourteenth OFDM symbols.

The plurality of CSI-RS RE groups are defined as RE locations of one CSI-RS RE group are shifted in time and frequency domains with respect to another CSI-RS RE group.

CSI-RSs for two antenna ports among the CSI-RSs for the eight or less antenna ports may be multiplexed using a Code Division Multiplexing (CDM) scheme using orthogonal codes of a length of 2 over two contiguous OFDM symbols on the same subcarrier.

In another downlink subframe different from the downlink subframe, the CSI-RSs for the eight or less antenna ports may be mapped to another CSI-RS RE group excluding one CSI-RS RE group selected from the plurality of CSI-RS RE groups for the downlink subframe.

In another aspect of the present invention, provided herein is a base station for transmitting Channel State Information-Reference Signals (CSI-RSs) for eight or less antenna ports, the base station including: a reception module configured to receive an uplink signal from a user equipment; a transmission module configured to transmit a downlink signal to the user equipment; and a processor configured to control the base station including the reception module and the transmission module, wherein the processor is further configured to select one of the plurality of CSI-RS RE groups defined on a data region of a downlink subframe and map CSI-RSs for the eight or less antenna ports to the selected CSI-RS RE group, and to transmit the downlink subframe, in which the CSI-RSs for the eight or less antenna ports are mapped, through the transmission module, and wherein the plurality of CSI-RS RE groups is defined such that a transmission diversity RE pair for data transmitted on the downlink subframe is not broken.

In another aspect of the present invention, provided herein is a user equipment for measuring channel information from Channel State Information-Reference Signals (CSI-RSs) for eight or less antenna ports, the user equipment including: a reception module configured to receive a downlink signal from a base station; a transmission module configured to transmit an uplink signal to the base station; and a processor configured to control the user equipment including the reception module and the transmission module, wherein the processor is further configured to receive a downlink subframe, in which the CSI-RSs for the eight or less antenna ports are mapped to one CSI-RS RE group selected from the plurality of CSI-RS RE groups defined on a data region of the downlink subframe, through the reception module, and to measure the channel information of each of the antenna ports using the CSI-RSs for the eight or less antenna ports, and wherein the plurality of CSI-RS RE groups is defined such that a transmission diversity RE pair for data transmitted on the downlink subframe is not broken.

According to the embodiments of the present invention, it is possible to provide a method and apparatus for multiplexing CSI-RSs on downlink physical resources and transmitting the multiplexed CSI-RSs such that a downlink reception side can efficiently perform channel estimation. In addition, it is possible to provide a method and apparatus for reducing inter-cell interference upon CSI-RS transmission while maintaining data transmission efficiency, by providing as many CSI-RS RE group patterns as possible without damaging a transmission diversity RE pair.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
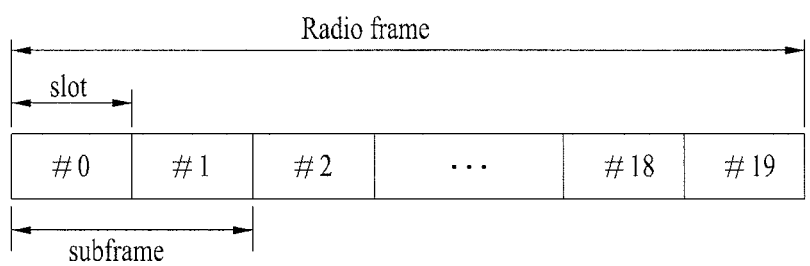
FIG. 1 is a diagram showing the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A. However, technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in the radio frame, the number of slots included in the subframe or the number of symbols included in the slot may be changed in various manners.

Figure 2:
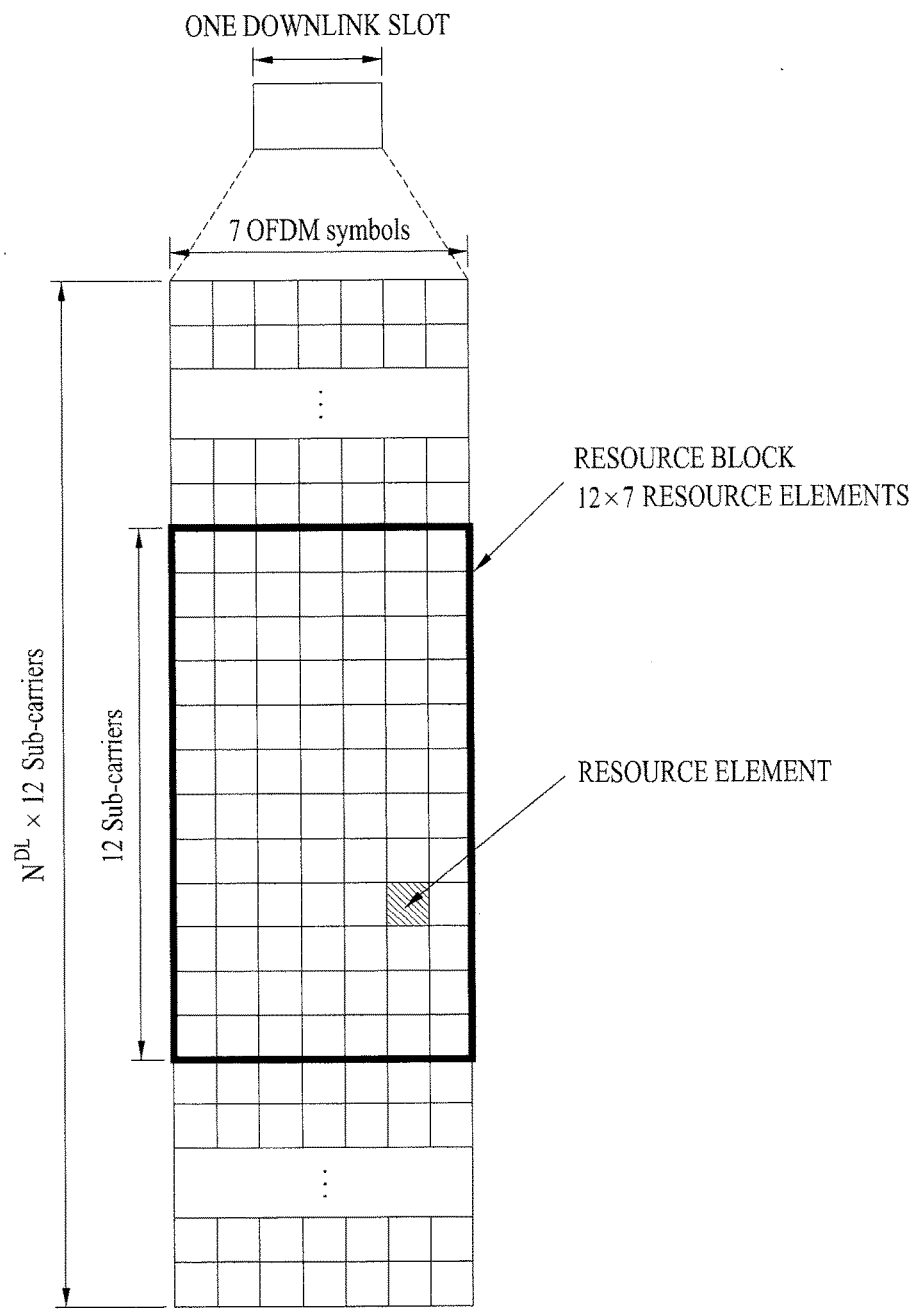
FIG. 2 is a diagram showing an example of a resource grid in one downlink slot.

FIG. 2 is a diagram showing an example of a resource grid in one downlink slot. OFDM symbols are configured by the normal CP. Referring to FIG. 2, the downlink slot includes a plurality of OFDM symbols in time domain and includes a plurality of RBs in frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, a RE a(k,l) is located at a k-th subcarrier and an l-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency domain. $N^{DL}$ denotes the number of RBs included in the downlink slot. The $N^{DL}$ is determined based on downlink transmission bandwidth set by scheduling of a base station.

Figure 3:
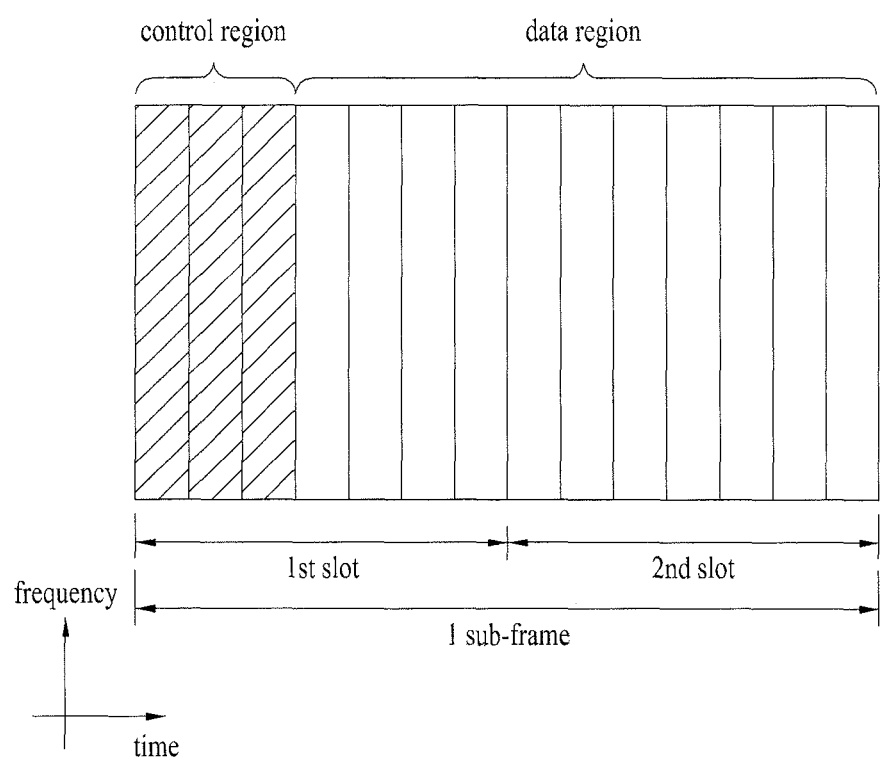
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
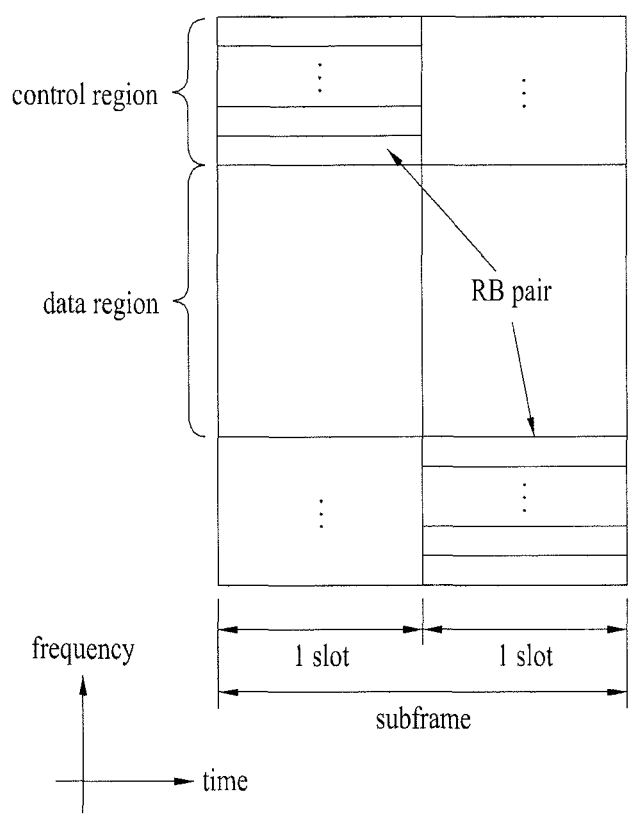
FIG. 4 is a diagram showing the structure of an uplink frame.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Modeling of Multi-Input Multi-Output (MIMO) System

An MIMO system improves data transmission/reception efficiency using multiple transmission antennas and multiple reception antennas. In the MIMO technology, a single antenna path is not used to receive a whole message, that is, whole data may be received by combining a plurality of pieces of data received through a plurality of antennas.

Figure 5:
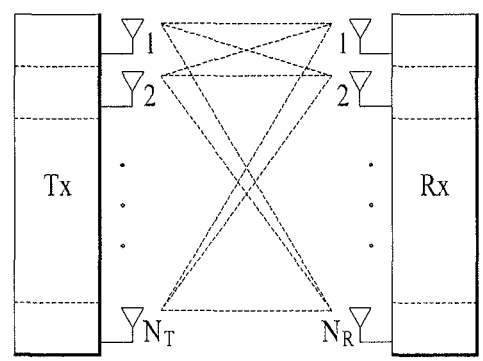
FIG. 5 is a diagram showing the configuration of a wireless communication system having multiple antennas.
Figure 5:
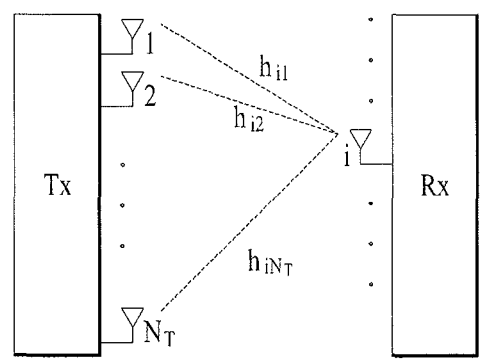

FIG. 5 is a diagram showing the configuration of a wireless communication system having multiple antennas. As shown in FIG. 5(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{Equation 2}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, Ŝ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Considers that the $N_T$ actually transmitted signals $x_1, x_2, \ldots, x_{N_T}$ are configured by applying a weight matrix W to the information vector Ŝ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

where, $W_{ij}$ denotes a weight between an i-th transmission antenna and j-th information. W is also called a precoding matrix.

The transmitted signal x may be differently processed using according to two schemes (for example, spatial diversity scheme and spatial multiplexing scheme). In case of the spatial multiplexing scheme, different signals are multiplexed and the multiplexed signal is transmitted to a receiver such that elements of information vector(s) have different values. In case of the spatial diversity scheme, the same signal is repeatedly transmitted through a plurality of channel paths such that elements of information vector(s) have the same value. A combination of the spatial multiplexing scheme and the spatial diversity scheme may be considered. That is, the same signal may be, for example, transmitted through three transmission antennas according to the spatial diversity scheme and the remaining signals may be transmitted to the receiver using the spatial multiplexing scheme.

If the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 5(b) is a diagram showing channels from the $N_T$ transmission antennas to the reception antenna i. The channels may be combined and expressed in the form of a vector and a matrix. In FIG. 5(b), the channels from the $N_T$ transmission antennas to the reception antenna i may be expressed as follows.

$$h_i^T = [h_{i1}, h_{i2}, \ldots, h_{iN_T}] \quad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{Equation 8}$$

An Additive White Gaussian Noise (AWGN) is added to the actual channels after a channel matrix H. The AWGN $n_1, n_2, \ldots, n_{N_R \text{ added to the } N^T}$ transmission antennas may be expressed as follows.

$$n = [n_1, n_2, \ldots, n_{N_R}]^T \quad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

$$Hx + n$$

The above description focuses on the case where a single user uses the MIMO system. However, it is possible to apply the MIMO system to a plurality of users so as to acquire multiuser diversity. Now, this will be briefly described.

A fading channel lowers performance of a wireless communication system. Channel gain is changed according to time, frequency and space. As a channel gain value is decreased, performance deterioration is increased. A diversity scheme for solving fading uses the fact that the probability that all several independent channels have low gain is very low. Various diversity schemes including the multiuser diversity scheme are possible.

When several users are present within a cell, since the channel gains of the users are stochastically independent, a probability that all the users have low gains is very low. According to information theory, if the transmit power of a base station is sufficient, all channels are allocated to a user having highest channel gain among the several users present within the cell so as to maximize the total capacity of the channels. The multiuser diversity scheme may be divided into three schemes.

A temporal multiuser diversity scheme is to allocate a channel to a user having the highest gain whenever the channel is changed with time. A frequency multiuser diversity scheme is to allocate subcarriers to a user having maximum gain in each frequency band in a frequency multicarrier system such as OFDM.

If a channel is slowly changed in a system which does not use multicarrier, a user having highest channel gain occupies the channel for a long time. Accordingly, the other users cannot perform communication. In this case, it is necessary to cause a channel change in order to use the multiuser diversity scheme.

Next, the spatial multiuser diversity scheme uses the fact that the channel gains of the users are different according to space. The implementation example thereof includes Random Beamforming (RBF), etc. The RBF is also referred to as "opportunistic beamforming" and causes a channel change by enabling a transmitter to perform beamforming with a certain weight using multiple antennas.

A multiuser MIMO (MU-MIMO) scheme which utilizes the above-described multiuser diversity scheme in the MIMO scheme will be described.

In the MU-MIMO scheme, the number of users and the number of antennas of each user in the transmitter/receiver may be variously combined. The MU-MIMO scheme may be described with respect to a downlink (forward link) and an uplink (reverse link). The downlink refers to the case where a base station transmits signals to several UEs. The uplink refers to the case where several UEs transmit signals to a base station.

In the downlink, in extreme cases, for example, one user may receive a signal through a total of $N_R$ antennas and a total of $N_R$ users may receive a signal using one antenna. In addition, a combination of the above-described extreme cases is possible. That is, a certain user may use one reception antenna and a certain user may use three reception antennas. In either case, it is noted that the total number of reception antennas is fixed to $N_R$. This case is generally referred to as an MIMO Broadcast Channel (BC) or Space Division Multiple Access (SDMA).

In the uplink, in extreme cases, one user may transmit a signal through a total of $N_T$ antennas and a total of $N_T$ users may transmit a signal using one antenna. In addition, a combination of the above-described extreme cases is possible. That is, a certain user may use one transmission antenna and a certain user may use three transmission antennas. In either case, it is noted that the total number of transmission antennas is fixed to $N_T$. This case is generally referred to as an MIMO Multiple Access Channel (MAC). Since the uplink and the downlink are symmetrical to each other, a scheme used in any one of the uplink and the downlink may be used in the other.

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

In MIMO transmission, the term "rank" denotes the number of paths for independently transmitting signals, and the term "number of layers" denotes the number of signal streams transmitted through each path. In general, since a transmitter transmits layers corresponding in number to the number of ranks used for signal transmission, the rank has the same meaning as the number of layers unless otherwise noted.

Hereinafter, the characteristics of a precoding matrix will be described. For example, a channel matrix H without considering the precoding matrix may be expressed as follows.

$$H = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} = [h_1 \ h_2 \ \cdots \ h_{N_T}] \quad \text{Equation 12}$$

In general, if a Minimum Mean Square Error (MMSE) receiver is given, $\rho_k$ (a k-th received Signal to Interference plus Noise Ratio (SINR)) is defined as follows.

$$\rho_k = SINR_k = h_k^H \left( N_0 I_{N_R} + \sum_{\substack{i=1 \\ i \neq k}}^{N_R} h_i h_i^H \right)^{-1} h_k \quad \text{Equation 13}$$

An effective channel $\tilde{H}$ applied to the precoding matrix may be expressed using a precoding matrix W as follows.

$$\tilde{H} = HW = \begin{bmatrix} \vec{h}_1^T \\ \vec{h}_1^T \\ \vdots \\ \vec{h}_{N_R}^T \end{bmatrix} [w_1 \ w_2 \ \cdots \ w_{N_R}] = \quad \text{Equation 14}$$

$$\begin{bmatrix} \vec{h}_1^T w_1 & \vec{h}_1^T w_2 & \cdots & \vec{h}_1^T w_{N_R} \\ \vec{h}_2^T w_1 & \vec{h}_2^T w_2 & \cdots & \vec{h}_2^T w_{N_R} \\ \vdots & \vdots & \vdots & \vdots \\ \vec{h}_{N_R}^T w_1 & \vec{h}_{N_R}^T w_2 & \cdots & \vec{h}_{N_R}^T w_{N_R} \end{bmatrix} = [\tilde{h}_1 \ \tilde{h}_2 \ \cdots \ \tilde{h}_{N_T}]$$

Accordingly, if it is assumed that the MMSE receiver is used, $\rho_k$ may be defined as follows.

$$\tilde{\rho}_k = SINR_k = \tilde{h}_k^H \left( N_0 I_{N_R} + \sum_{\substack{i=1 \\ i \neq k}}^{N_R} \tilde{h}_i \tilde{h}_i^H \right)^{-1} \quad \text{Equation 15}$$

$$\tilde{h}_k = [w_k^H \vec{h}_1^* \ w_k^H \vec{h}_2^* \ \cdots \ w_k^H \vec{h}_{N_R}^*]$$

$$\left( N_0 I_{N_R} + \sum_{\substack{i=1 \\ i \neq k}}^{N_R} \tilde{h}_i \tilde{h}_i^H \right)^{-1} \begin{bmatrix} \vec{h}_1^T w_k \\ \vec{h}_2^T w_k \\ \vdots \\ \vec{h}_{N_R}^T w_k \end{bmatrix}$$

Effectiveness on the SINR received according to the variations of the precoding matrix can be confirmed based on the theoretical background. First, the effectiveness of column permutation in one precoding matrix can be confirmed. That is, in case of permutation between an i-th column vector $W_i$ and a j-th column vector $W_j$, the permutated precoding matrix $\hat{W}$ may be expressed as follows.

$$W = [w_1 \ \ldots \ w_i \ \ldots \ w_j \ \ldots \ w_{N_R}]$$

$$\hat{W} = [w_1 \ \ldots \ w_j \ \ldots \ w_i \ \ldots \ w_{N_R}] \quad \text{Equation 16}$$

Accordingly, the effective channel $\tilde{H}$ according to the precoding matrix W and the effective channel $\hat{\tilde{H}}$ according to the precoding matrix $\hat{W}$ may be expressed as follows.

$$\tilde{H} = HW = \begin{bmatrix} \vec{h}_1^T \\ \vec{h}_1^T \\ \vdots \\ \vec{h}_{N_R}^T \end{bmatrix} [w_1 \ \ldots \ w_i \ \ldots \ w_j \ \ldots \ w_{N_R}] = \quad \text{Equation 17}$$

$$\begin{bmatrix} \vec{h}_1^T w_1 & \ldots & \vec{h}_1^T w_i & \ldots & \vec{h}_1^T w_j & \ldots & \vec{h}_1^T w_{N_T} \\ \vec{h}_2^T w_1 & \ldots & \vec{h}_2^T w_i & \ldots & \vec{h}_2^T w_j & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_i & \ldots & \vec{h}_{N_R}^T w_j & \ldots & \vec{h}_{N_R}^T w_{N_T} \end{bmatrix} =$$

$$[\tilde{h}_1 \ \ldots \ \tilde{h}_i \ \ldots \ \tilde{h}_j \ \ldots \ \tilde{h}_{N_T}]$$

$$\hat{H} = H\hat{W} = \begin{bmatrix} \vec{h}_1^T \\ \vec{h}_1^T \\ \vdots \\ \vec{h}_{N_R}^T \end{bmatrix} [w_1 \ \ldots \ w_j \ \ldots \ w_i \ \ldots \ w_{N_R}] =$$

Equation 18

$$\begin{bmatrix} \vec{h}_1^T w_1 & \ldots & \vec{h}_1^T w_j & \ldots & \vec{h}_1^T w_i & \ldots & \vec{h}_1^T w_{N_T} \\ \vec{h}_2^T w_1 & \ldots & \vec{h}_2^T w_j & \ldots & \vec{h}_2^T w_i & \ldots & \vec{h}_2^T w_{N_T} \\ \vdots & \vdots & \vdots & \vdots & \vdots & \vdots & \vdots \\ \vec{h}_{N_R}^T w_1 & \ldots & \vec{h}_{N_R}^T w_j & \ldots & \vec{h}_{N_R}^T w_i & \ldots & \vec{h}_{N_R}^T w_{N_T} \end{bmatrix} =$$

$$[\tilde{h}_1 \ \ldots \ \tilde{h}_j \ \ldots \ \tilde{h}_i \ \ldots \ \tilde{h}_{N_T}]$$

In Equations 17 and 18, even when two column vectors are permutated, the received SINR is not changed except for order thereof, and a rate of a channel capacity to a sum may be fixed. Even in Equations 14 and 15, the permutated effective channel and $\rho_k$ may be acquired as follows.

$$\hat{H} = H\hat{W} = \begin{bmatrix} \vec{h}_1^T \\ \vec{h}_1^T \\ \vdots \\ \vec{h}_{N_R}^T \end{bmatrix} [\hat{w}_1 \ \hat{w}_2 \ \ldots \ \hat{w}_{N_R}] =$$

Equation 19

$$\begin{bmatrix} \vec{h}_1^T \hat{w}_1 & \vec{h}_1^T \hat{w}_2 & \ldots & \vec{h}_1^T \hat{w}_{N_R} \\ \vec{h}_2^T \hat{w}_1 & \vec{h}_2^T \hat{w}_2 & \ldots & \vec{h}_2^T \hat{w}_{N_R} \\ \vdots & \vdots & \vdots & \vdots \\ \vec{h}_{N_R}^T \hat{w}_1 & \vec{h}_{N_R}^T \hat{w}_2 & \ldots & \vec{h}_{N_R}^T \hat{w}_{N_R} \end{bmatrix} = [\hat{h}_1 \ \hat{h}_2 \ \ldots \ \hat{h}_{N_T}]$$

$$\hat{\rho}_k = SINR_k = \hat{h}_k^H \left( N_0 I_{N_R} + \sum_{\substack{i=1 \\ i \neq k}}^{N_R} \hat{h}_i \hat{h}_i^H \right)^{-1} \hat{h}_k$$

Equation 20

In Equation 20, an interference and noise portion may be expressed as follows.

$$\left( N_0 I_{N_R} + \sum_{\substack{i=1 \\ i \neq k}}^{N_R} \hat{h}_i \hat{h}_i^H \right)^{-1} = \begin{bmatrix} a_{11}^k & a_{12}^k & \ldots & a_{1N_R}^k \\ a_{21}^k & a_{22}^k & \ldots & a_{2N_R}^k \\ \vdots & \vdots & \vdots & \vdots \\ a_{N_R1}^k & a_{N_R2}^k & \ldots & a_{N_RN_R}^k \end{bmatrix}$$

Equation 21

The newly received SINR $\hat{\rho}_k$ may be expressed as follows.

$$\hat{\rho}_k = SINR_k = \hat{h}_k^H \left( N_0 I_{N_R} + \sum_{\substack{i=1 \\ i \neq k}}^{N_R} \hat{h}_i \hat{h}_i^H \right)^{-1} \hat{h}_k =$$

Equation 22

$$\hat{h}_k^H \begin{bmatrix} a_{11}^k & a_{12}^k & \ldots & a_{1N_R}^k \\ a_{21}^k & a_{22}^k & \ldots & a_{2N_R}^2 \\ \vdots & \vdots & \vdots & \vdots \\ a_{N_R1}^k & a_{N_R2}^k & \ldots & a_{N_RN_R}^k \end{bmatrix} \hat{h}_k =$$

$$\sum_{i=1}^{N_R} \sum_{j=1}^{N_R} \hat{w}_k \vec{h}_i^* \times a_{ij} \times \vec{h}_j^T \hat{w}_k$$

Next, in one precoding matrix, effectiveness for multiplication of a specific column vector by $e^{-j\theta}$ ($0 \leq \theta \leq \pi$) can be confirmed. For example, $e^{-j\theta}$ may be $\pm 1$ or $\pm j$. $\tilde{W}_k$ obtained by multiplying a k-th column by $e^{-j\theta}$ may be expressed as follows.

$$\tilde{W}_k = e^{-j\theta} \hat{W}_k$$

The received SINR $\tilde{\rho}_k$ may be expressed as follows.

$$\tilde{\rho}_k = \sum_{i=1}^{N_R} \sum_{j=1}^{N_R} \tilde{w}_k \vec{h}_i^* \times a_{ij} \times \vec{h}_j^T \tilde{w}_k$$

Equation 24

$$= \sum_{i=1}^{N_R} \sum_{j=1}^{N_R} e^{+j\theta} \hat{w}_k \vec{h}_i^* \times a_{ij} \times \vec{h}_j^T e^{-j\theta} \hat{w}_k$$

$$= \sum_{i=1}^{N_R} \sum_{j=1}^{N_R} \hat{w}_k \vec{h}_i^* \times a_{ij} \times \vec{h}_j^T \hat{w}_k$$

$$= \hat{\rho}_k$$

From the result of Equation 24, it can be seen that the multiplication of the specific column vector of the precoding matrix by $e^{-j\theta}$ does not have influence on the received SINR and the rate of the channel capacity to the sum.

In the MIMO system, various MIMO transmission schemes (transmission modes) may be used. The MIMO transmission/reception scheme used for the operation of the MIMO system may include a Frequency Switched Transmit Diversity (FSTD) scheme, a Space Frequency Block Code (SFBC) scheme, a Space Time Block Code (STBC) scheme, a Cyclic Delay Diversity (CDD) scheme, a Time Switched Transmit Diversity (TSTD) scheme, etc. In rank 2 or more, a Spatial Multiplexing (SM) scheme, a Generalized Cyclic Delay Diversity (GCDD) scheme, a Selective Virtual Antenna Permutation (S-VAP), etc. may be used.

The FSTD scheme is to allocate subcarriers having different frequencies to signals transmitted through multiple antennas so as to obtain diversity gain. The SFBC scheme is to efficiently apply selectivity of a spatial domain and a frequency domain so as to obtain diversity gain and multiuser scheduling gain. The STBC scheme is to apply selectivity of a spatial domain and a time domain. The CDD scheme is to obtain diversity gain using path delay between transmission antennas. The TSTD scheme is to temporally divide signals transmitted through multiple antennas. The spatial multiplexing scheme is to transmit different data through antennas so as to increase a transfer rate. The GCDD scheme is to apply selectivity of a time domain and a frequency domain. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

Various scheduling signaling formats (PDCCH DCI formats) may be used according to the above-described various MIMO transmission schemes (MIMO transmission modes). That is, the scheduling signaling formats may vary according to various MIMO transmission modes, and a user equipment may determine an MIMO transmission mode according to a scheduling signaling format.

In the MIMO system, an open-loop scheme (or a channel-independent scheme) without using feedback information from a receiver and a closed-loop scheme (or a channel-dependent scheme) using feedback information from a receiver may be employed. In the closed-loop scheme, a receiver transmits feedback information regarding a channel state to a transmitter and a transmitter checks a channel state, thereby improving performance of a wireless communication system. The closed-loop MIMO system uses a precoding scheme for minimizing the influence of a channel by enabling a transmitter to perform a predetermined process with respect to transmitted data using the feedback information regarding a channel environment transmitted from a receiver. The precoding scheme includes a codebook based precoding scheme and a precoding scheme for quantizing channel information and feeding back the quantized channel information.

MIMO System According to OFDM and SC-FDMA Scheme

In general, in the MIMO system according to the OFDM scheme or the SC-FDMA scheme, a data signal is subjected to complicated mapping within transmitted symbols. First, the data is divided into codewords. Mostly, the codewords correspond to transfer blocks given by an MAC layer. The codewords are separately encoded using a channel coder such as a turbo code or a tail-biting convolutional code. The encoded codewords are rate-matched to adequate sizes and are mapped to layers. Discrete Fourier Transform (DFT) precoding is performed with respect to the layers in SC-FDMA transmission, and DFT is not applied to OFDM transmission. In each layer, the DFT signals are multiplied by a precoding vector/matrix and are mapped to transmission antenna ports. The transmission antenna ports may be mapped to physical antennas using an antenna virtualization method.

Figure 6:
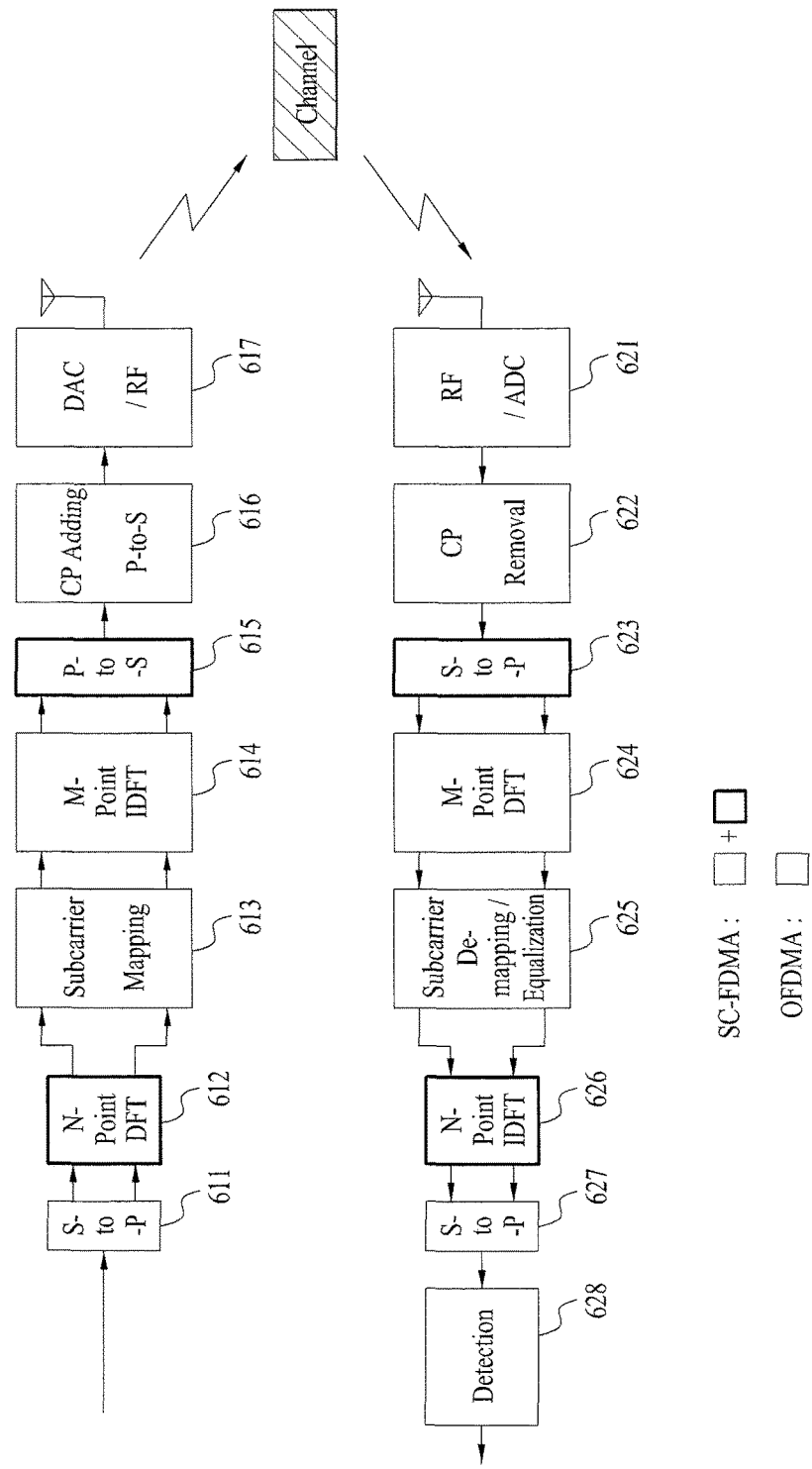
FIG. 6 is a diagram showing a general structure of an SC-FDMA and OFDMA system.

FIG. 6 is a diagram showing a general structure of an SC-FDMA and OFDMA system. In FIG. 6, N is less than M. S-to-P means that a serial signal is converted into a parallel signal and P-to-S means that a parallel signal is converted into a serial signal. As shown in FIG. 6, in a transmitter of the SC-FDMA system, input information symbols pass through a serial-to-parallel conversion unit 611, an N-point DFT unit 612, a subcarrier mapping unit 613, an M-point Inverse DFT (IDFT) unit 614, a parallel-to-serial conversion unit 615, a CP adding unit 616 and a digital-to-analog conversion unit 617 such that a signal is transmitted through a channel. In a receiver of the SC-FDMA system, a signal received through a channel passes through an analog-to-digital conversion unit 621, a CP removal unit 622, a serial-to-parallel conversion unit 623, an M-point DFT unit 624, a subcarrier de-mapping/equalization unit 625, an N-point IDFT unit 626, a parallel-to-serial conversion unit 627 and a detection unit 628 so as to restore information symbols. In the OFDMA system, the N-point DFT unit 612 and the parallel-to-serial conversion unit 615 of the transmitter of the SC-FDMA system may be omitted and the parallel-to-serial conversion unit may be performed by the CP adding unit 616. In addition, the serial-to-parallel conversion unit 623 and the N-point IDFT unit 626 of the receiver of the SC-FDMA system may be omitted.

In general, a Cubic Metric (CM) value or Peak power to Average Power Ratio (PAPR) of a single-carrier signal such as an SC-FDMA transmission signal is significantly lower than that of a multicarrier signal. The CM value and PAPR are associated with a dynamic range supported by a Power Amplifier (PA) of a transmitter. In case of using the same PA, a transmitted signal having a CM value or PAPR lower than that of the other signal may be transmitted with high transmit power. In other words, if the maximum power of the PA is fixed, the transmit power is set to be lower than that of a signal having a low CM value or PAPR in order to enable the transmitter to transmit a signal having a high CM value or PAPR. The reason why the single-carrier signal has a CM value or PAPR lower than that of the multicarrier signal is because, in case of the multicarrier signal, a plurality of signals overlaps each other so as to apply a co-phase to the signal. Then, the amplitude of the signal may be increased and the OFDM system may have a high PAPR or CM value.

If a transmitted signal y includes only one information symbol $x_1$, this signal may be a single-carrier signal as $y=x_1$. However, if the transmitted signal y includes a plurality of information symbols $x_1, x_2, x_3, \ldots$, and $x_N$, this signal may be a multi-carrier signal as $y=x_1+x_2+x_3+\ldots+x_N$. The PAPR or CM value is proportional to the number of information symbols which are coherently summed in a transmission signal waveform, but is saturated when the number of information symbols reaches a predetermined value. Accordingly, if a signal waveform is generated by summing a small number of single-carrier signals, the CM value or the PAPR has a value significantly less than that of a multi-carrier signal, but has a value slightly higher than a single-carrier signal.

Figure 7:
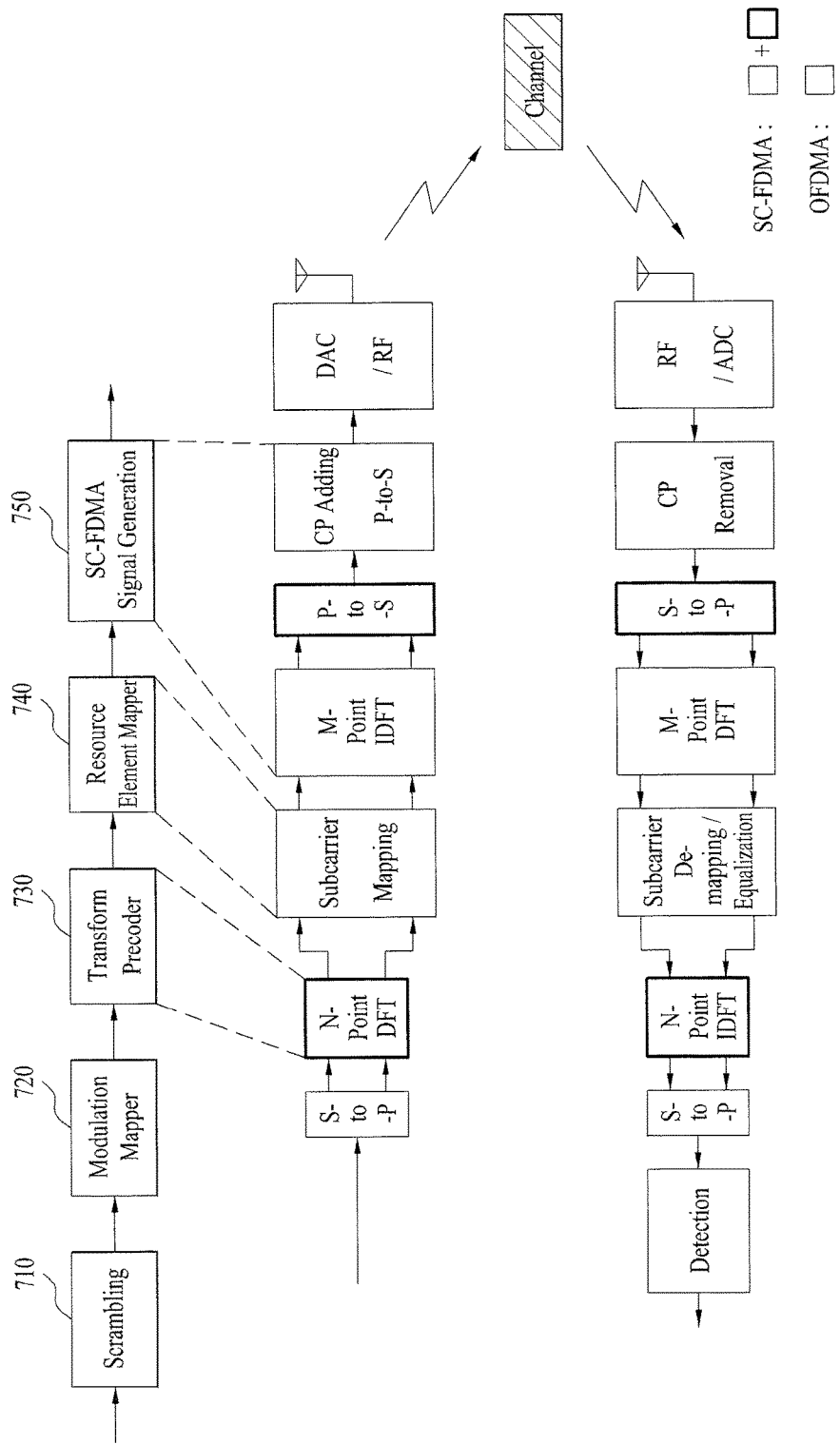
FIG. 7 is a diagram showing a structure of an uplink SC-FDMA system of an LTE release-8 system.

FIG. 7 is a diagram showing a structure of an uplink SC-FDMA system of an LTE release-8 system. The structure of the uplink SC-FDMA system of the LTE release-8 system includes a scrambling unit 710, a modulation mapper 720, a transform precoder 730, a resource element mapper 740, and an SC-FDMA signal generation unit 750, as shown in FIG. 7. As shown in FIG. 7, the transform precoder 730 corresponds to the N-point DFT unit 612 of FIG. 6, the resource element mapper 740 corresponds to the subcarrier mapping unit 613 of FIG. 6, and the SC-FDMA signal generation unit 750 corresponds to the M-point IDFT unit 614, the parallel-to-serial conversion unit 615 and the CP adding unit 616 of FIG. 6.

Figure 8:
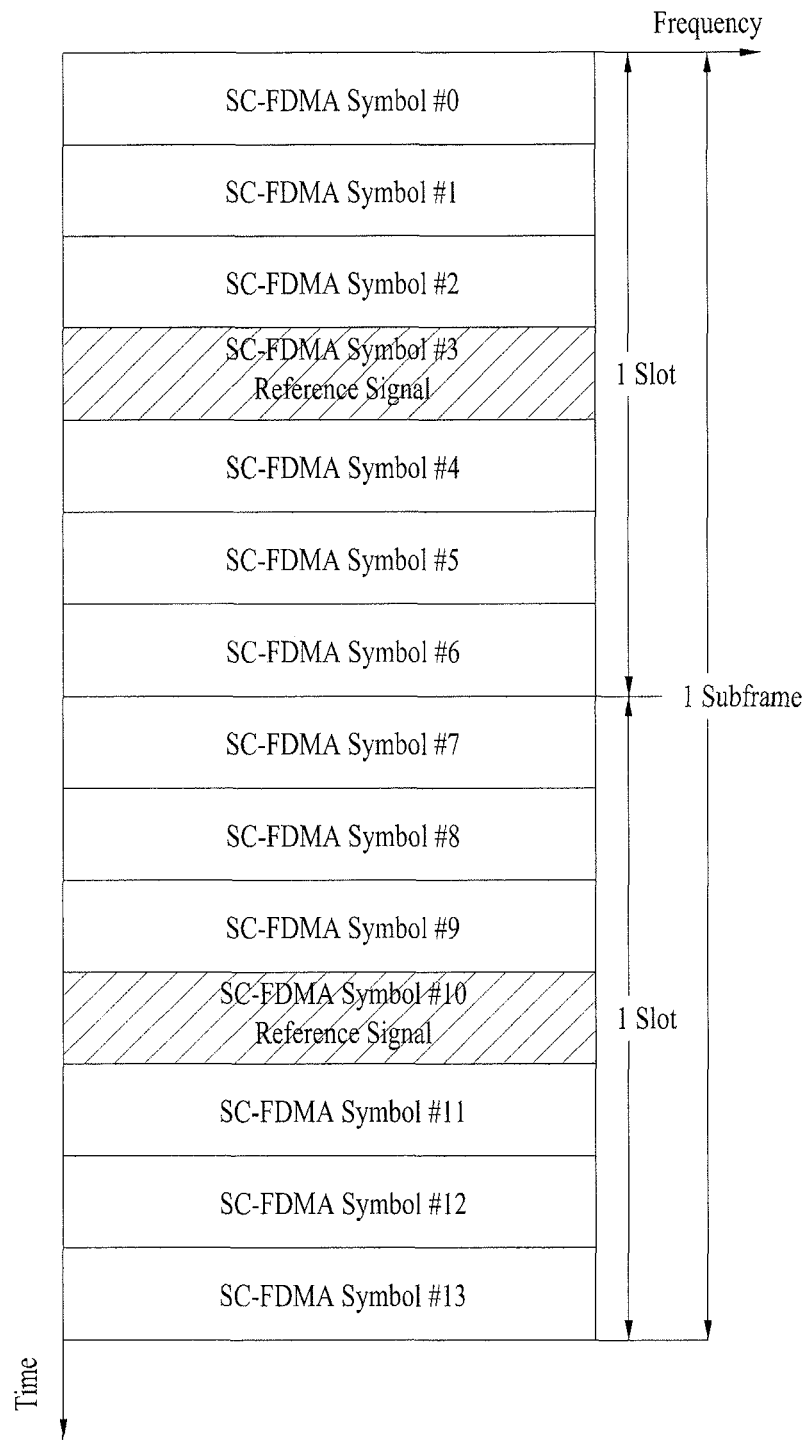
FIG. 8 is a diagram showing a transmission frame structure of an uplink SC-FDMA system of an LTE release-8 system.

FIG. 8 is a diagram showing a transfer frame structure of an uplink SC-FDMA system of an LTE release-8 system. The basic transfer unit is one subframe. One subframe includes two slots and the number of SC-FDMA symbols included in one slot is 7 or 6 according to the CP configuration (e.g., a normal CP or an extended CP). In FIG. 8, the normal CP in which one slot includes seven SC-FDMA symbols is shown. At least one Reference Signal (RS) SC-FDMA symbol is included in each slot and is not used for data transmission. A plurality of subcarriers is included in one SC-FDMA symbol. A Resource Element (RE) is a complex information symbol mapped to one subcarrier. If DFT precoding is performed, since the DFT size and the number of subcarriers used for transmission is identical in the SC-FDMA, the RE corresponds to one information symbol mapped to one DFT index.

In the LTE-A system, spatial multiplexing of a maximum of four layers is considered for uplink transmission. In case of uplink single-user spatial multiplexing, a maximum of two transfer blocks may be transmitted from a scheduled UE in one subframe for every uplink component carrier. The component carrier refers to a carrier of an aggregation unit in carrier aggregation technology for physically aggregating a plurality of component carriers so as to obtain the same effect as the logical use of a large band. Modulation symbols associated with each transfer block may be mapped to one or two layers according to the number of transfer layers. In the mapping relationship between the transfer blocks and the layers, the same principle as the mapping principle between the transfer blocks and the layers in LTE Release-8 downlink spatial multiplexing may be used. Both in the cases where spatial multiplexing is used and is not used, a DFT precoded OFDM scheme may be used as a multiple access scheme of uplink data transmission. In case of multiple component carriers, one DFT may be applied per component carrier. In particular, in the LTE-A system, frequency-contiguous and frequency-non-contiguous resource allocation may be supported with respect to each component carrier.

Figure 9:
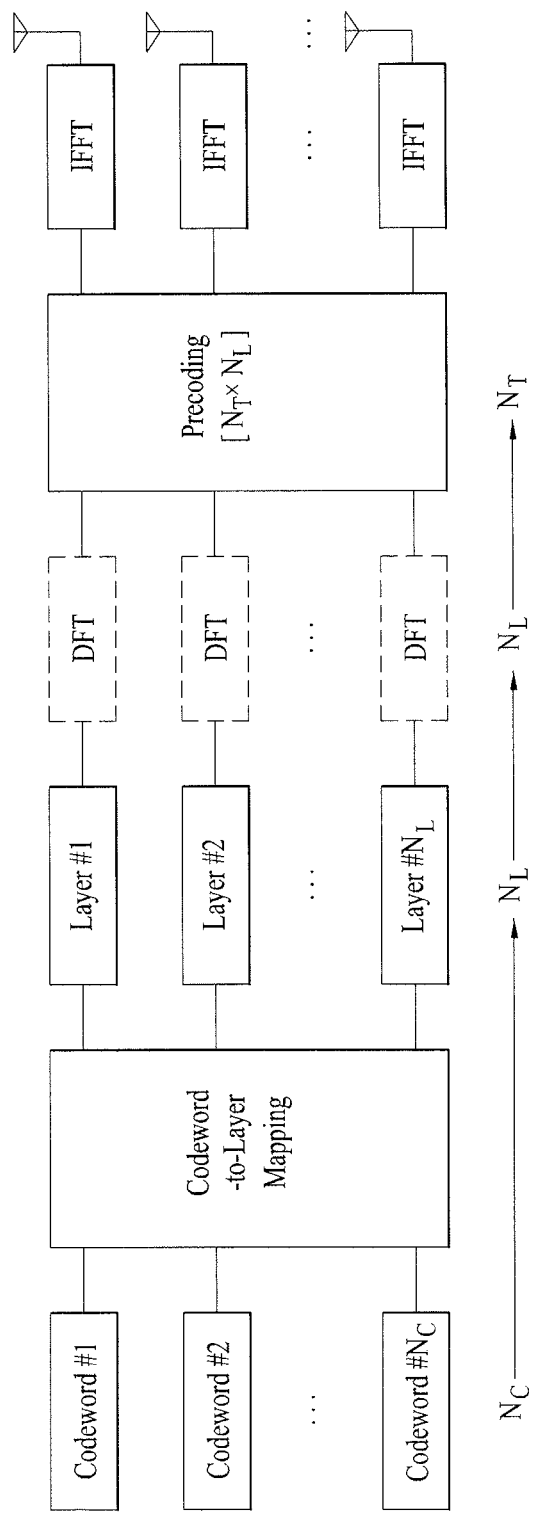
FIG. 9 is a diagram showing a data signal mapping relationship in an MIMO system based on SC-FDMA transmission.

FIG. 9 is a diagram showing a data signal mapping relationship in an MIMO system based on SC-FDMA transmission. The SC-FDMA system may include layer mappers for mapping signals to be transmitted to layers corresponding in number to a specific rank, a predetermined number of DFT modules for performing DFT spreading with respect to each of a predetermined number of layer signals, and a precoder for selecting a precoding matrix from a codebook stored in a memory and performing precoding with respect to the transmitted signals. In FIG. 9, if the number of codewords is $N_C$ and the number of layers is $N_L$, $N_C$ information symbols or information symbols corresponding in number to an integral multiple of $N_C$ may be mapped to $N_L$ layers or layers corresponding in number to an integral multiple of $N_L$. The DFT precoding for SC-FDMA does not change the size of the layer. If precoding is performed with respect to the layer, the number of information symbols is changed from $N_L$ to $N_T$ by multiplication of an $N_T \times N_L$ matrix. In general, the transmission rank of the spatially multiplexed data is equal to the number (e.g., $N_L$) of layers for carrying data at a given transmission time. As shown in FIG. 9, the DFT modules for transmitting uplink signals using the SC-FDMA scheme are arranged on the front stage of the precoder and the back stage of the layer mappers. Thus, the DFT spread signals are precoded per layer, are subjected to IFFT dispreading and are transmitted, thereby maintaining PAPR or CM characteristics due to the effect that the DFT spreading and IFFT dispreading are offset except for precoding.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 10:
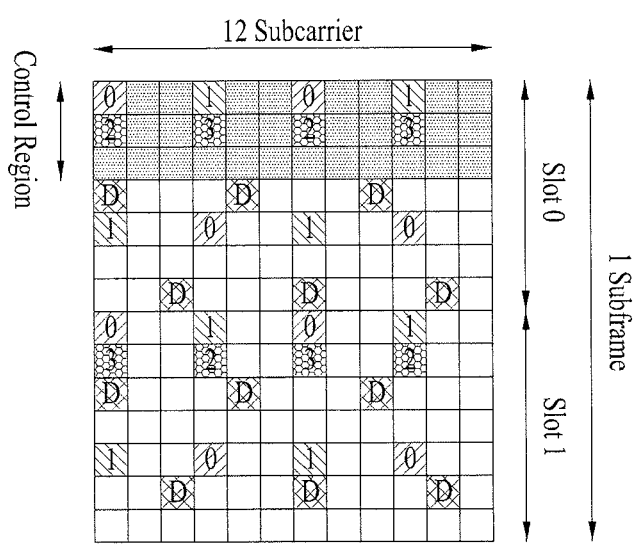
FIG. 10 is a diagram showing a pattern of CRSs and DRSs mapped on a downlink Resource block (RB) defined in the legacy 3GPP LTE system (e.g., Release-8)

FIG. 10 is a diagram showing a pattern of CRSs and DRSs mapped on a downlink RB defined in the existing 3GPP LTE system (e.g., Release-8). The downlink RB as a mapping unit of the RSs may be expressed in units of 12 subcarriers on one subframe×frequency on a time axis. That is, on the time axis, one RB has a length of 14 OFDM symbols in case of the normal CP.

FIG. 10 shows the locations of the RSs on the RB in the system in which the eNodeB supports four transmission antennas. In FIG. 10, Resource Elements (REs) denoted by "0", "1", "2" and "3" indicate the locations of the CRSs of the antenna port indexes 0, 1, 2 and 3. In FIG. 10, the RE denoted by "D" indicates the location of the DRS defined in LTE Release-8 (or Release-9).

Hereinafter, the CRS will be described in detail.

The CRS is used to estimate the channel of a physical antenna port and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 25.

$$k = 6m + (v + v_{shift}) \bmod 6 \qquad \text{Equation 25}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 25, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In detail, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in the case of the normal CP and are located on symbol indexes 0 and 3 of the slot in the case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in the case of the extended CP) of the slot and the RSs for the antenna ports 2 and 3 are located on the symbol index 1 of the slot. The frequency locations of the RSs for the antenna ports 2 and 3 in the frequency domain are switched to each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, new RSs (CSI-RSs) for measuring the CSI for the new antenna ports need to be designed. Details thereof will be described after the description of the DRS.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 26 and 27. Equation 27 is for the normal CP and Equation 27 is for the extended CP.

$$k = (k') \bmod N_{sc}^{RB} + N_{sc}^{RB} \cdot n_{PRB} \qquad \text{Equation 26}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$k = (k') \bmod N_{sc}^{RB} + N_{sc}^{RB} \cdot n_{PRB} \qquad \text{Equation 27}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0, & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 26 and 27, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolved version of the 3GPP LTE system, high-order MIMO, multi-cell transmission, evolved MU-MIMO or the like is considered. In order to support efficient RS management and a developed transmission scheme, DMRS-based data demodulation is considered. That is, separately from the DMRS (antenna port index 5) for Rank 1 beamforming defined in the existing 3GPP LTE (e.g., Release-8) system, DMRSs for two or more layers may be defined in order to support data transmission through the added antenna. Since the DMRS is precoded by the same precoder as data, a reception side may easily estimate channel information for demodulating data without separate precoding information.

By arranging DMRSs supporting maximum Rank-8 transmission on radio resources, DMRSs for layers may be multiplexed and arranged. Time Division Multiplexing (TDM) indicates that DMRSs for two or more layers are arranged on different time resources (e.g., OFDM symbols). Frequency Division Multiplexing (FDM) indicates that DMRSs for two or more layers are arranged on different frequency resources (e.g., subcarriers). Code Division Multiplexing (CDM) indicates that DMRSs for two or more layers arranged on the same radio resources are multiplexed using orthogonal sequence (or orthogonal covering).

Figure 11:
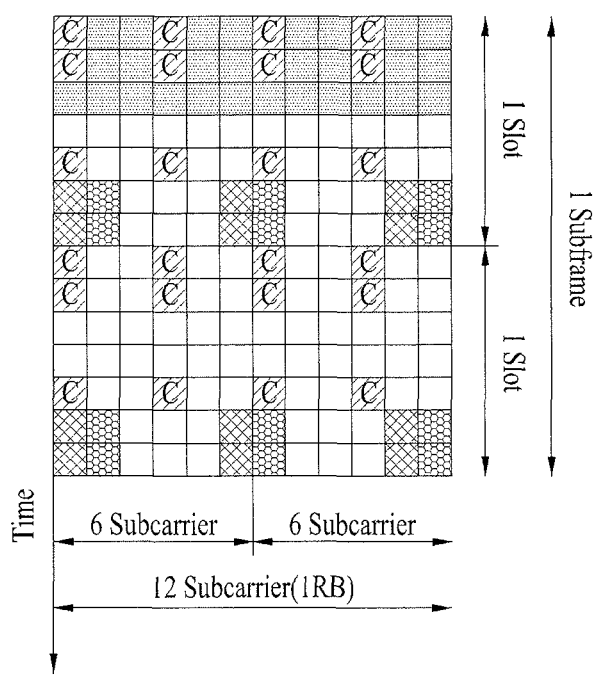
FIG. 11 is a diagram showing an example of a DMRS pattern supporting maximum Rank-8 transmission.

FIG. 11 is a diagram showing an example of a DMRS pattern supporting a maximum Rank-8 transmission. In FIG. 11, a control region (first to third symbols of one subframe) indicates REs on which a PDCCH may be transmitted. CRSs for 4 transmission antennas indicate REs in which CRSs for antenna ports "0", "1", "2" and "3" described with reference to FIG. 10 are arranged. In this case, a $V_{shift}$ value is 0.

In general, in case of SU-MIMO transmission, the number of antenna ports (or virtual antenna ports) of the DMRSs used for data transmission is equal to the transmission rank of data transmission. In this case, the DMRS antenna ports (or virtual antenna ports) may be numbered from 1 to 8, and a lowest "N" DMRS antenna port may be used for rank "N" SU-MIMO transmission.

If the DMRS antenna ports are numbered as shown in FIG. 11, the total number of REs on which data is not transmitted due to the arrangement of the DMRSs within a single transmission layer is determined according to a transmission rank. In a low rank (e.g., Rank 1 or 2), the number of REs used for DMRS transmission may be 12 in one RB. In a high rank (e.g., Rank 3 to 8), the number of REs used for DMRS transmission may be 24 in one RB. That is, as shown in FIG. 11, in case of Rank 2, the DMRSs for layers 1 and 2 may be transmitted on 12 REs (REs shown by the DMRS locations for the layers 1, 2, 5 and 7 of FIG. 11) and, in case of Rank 3, the DMRSs for layers 1 and 2 are transmitted on 12 REs and the DMRSs for the layer 3 may be transmitted on 12 additional REs (REs shown by the DMRS locations for the layers 3, 4, 6 and 8 of FIG. 11). The locations of the REs in which the DMRSs for each layer are arranged are exemplary and the present invention is not limited thereto.

CSI-RS Pattern

In the present invention, a new method of arranging (multiplexing) CSI-RSs on radio resources in consideration of the above-described CRS and DMRS locations is proposed. The CSI-RSs may be transmitted by a base station and may be used to estimate CSI in a UE. The CSI measured by the CSI-RSs may include precoding information (e.g., Precoding Matrix Index (PMI)), the number of preferred transmission layers (e.g., a Rank Indicator (RI)) and a preferred Modulation and Coding Scheme (MCS) (e.g., Channel Quality Indicator (CQI)).

CRSs are necessary for an accurate operation of a UE (legacy UE) which operates according to the legacy LTE system and DMRSs are necessary for easily performing data demodulation of an extended antenna configuration. Accordingly, in order to support efficient channel information acquisition of a downlink reception side through CSI-RSs, it is necessary to set a CSI-RS pattern (locations on resource blocks) such that a maximum number of CSI-RSs are transmitted in consideration of the arrangement of CRSs and DMRSs on radio resources. This is because a UE may accurately estimate a channel between a serving cell and the UE when collision between CSI-RSs from a neighboring cell and CSI-RSs from the serving cell is prevented. Accordingly, as the number of CSI-RS patterns which can be distinguishably used by several cells is increased, it is possible to guarantee the improvement of channel estimation performance through CSI-RSs.

In the present invention, REs used by a group of CSI-RS antenna ports are grouped and a CSI-RS RE group includes contiguous REs which are available in frequency domain. Configuration of the CSI-RS group using contiguous REs in the frequency domain is to prevent a base transmission block for a transmission diversity scheme such as Space-Frequency Block Coding (SFBC) and SFBC-Frequency Selective Transmit Diversity (SFBC-FSTD) from being broken due to the arrangement of the CSI-RSs. In detail, since data cannot be transmitted in REs on which CSI-RSs are transmitted, if data is transmitted on the base transmission block for transmission diversity and CSI-RSs are arranged only in a part of the base transmission block, transmission diversity RE pairs of data transmission may be broken.

Available REs refer to REs which do not include CRSs and DMRSs in a data region except for a control region (first to third OFDM symbols of a downlink subframe) in a downlink RB (one subframe (12 or 14 OFDM symbols) in a time domain×one RB (12 subcarriers) in a frequency domain). That is, available REs in which CSI-RSs may be arranged correspond to non-allocated REs of FIG. 11.

Examples of the CSI-RS RE group are shown in FIGS. 12 to 16.

Figure 12:
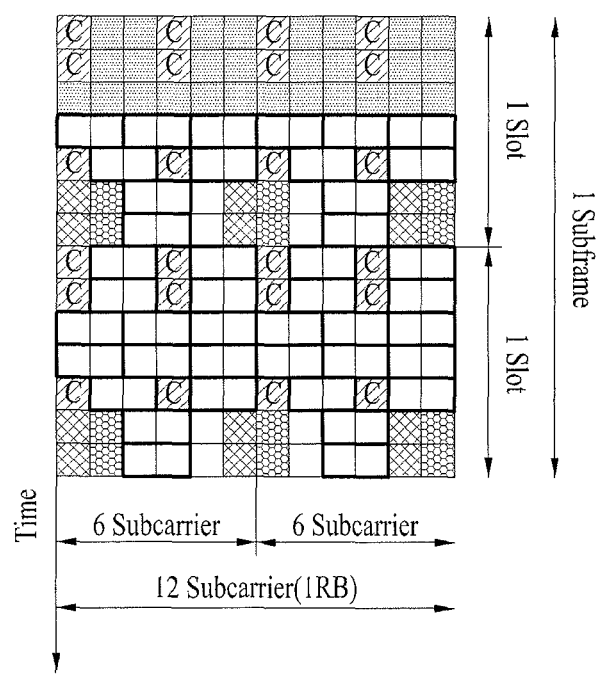
FIGS. 12 to 16 are diagrams showing various examples of a CSI-RS RE group.

In FIG. 12, an example of setting CSI-RS RE groups on two contiguous subcarriers is shown. It can be seen from FIG. 12 that CSI-RS RE groups are defined in REs except for REs in which CRSs and DMRSs are arranged.

Figure 13:
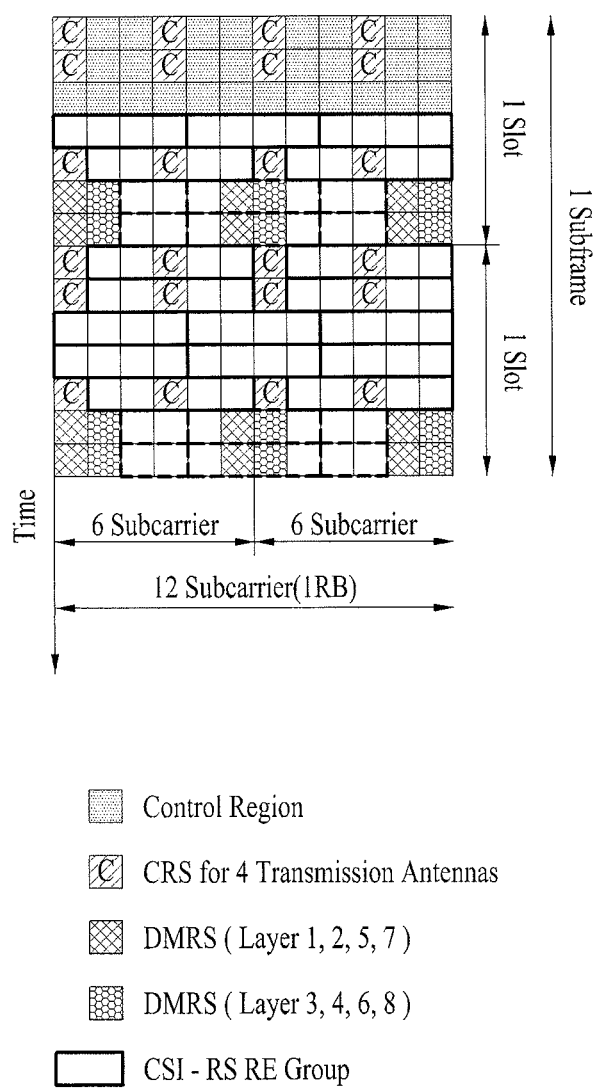

In FIG. 13, an example of setting CSI-RS RE groups on four contiguous subcarriers is shown. In FIG. 13, a certain CSI-RS RE group may appear to be set over five subcarriers. However, since CSI-RSs are not transmitted in the REs, in which CRSs are arranged, among the CSI-RS RE groups, it can be seen that CSI-RS RE groups are set on four REs.

Figure 14:
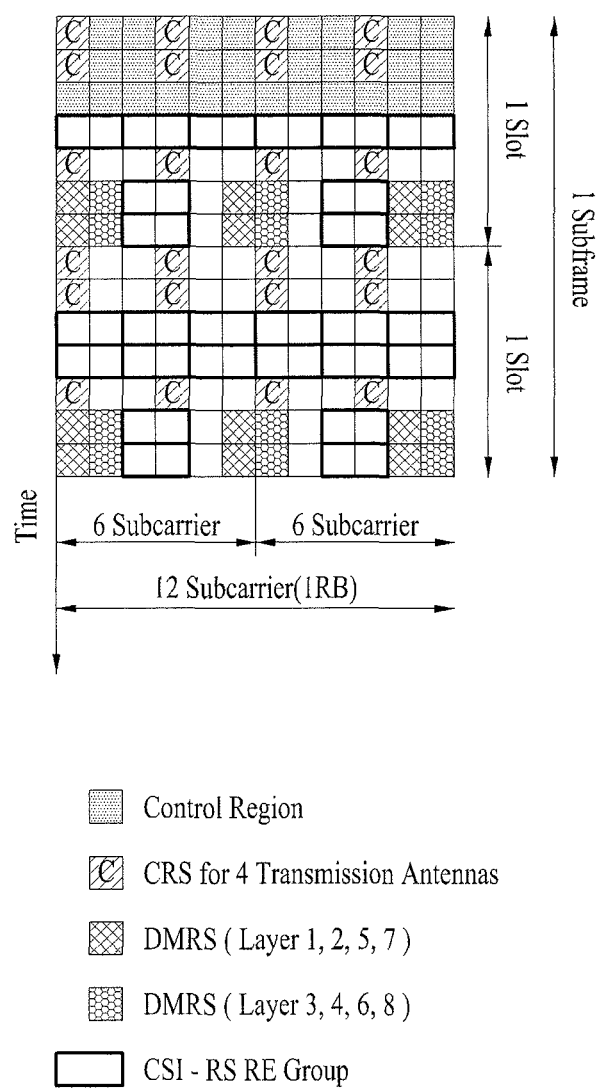

In FIG. 14, an example of setting CSI-RS RE groups on two contiguous subcarriers is shown. It can be seen from FIG. 14 that CSI-RS RE groups are not defined on OFDM symbols in which CRSs are arranged.

Figure 15:
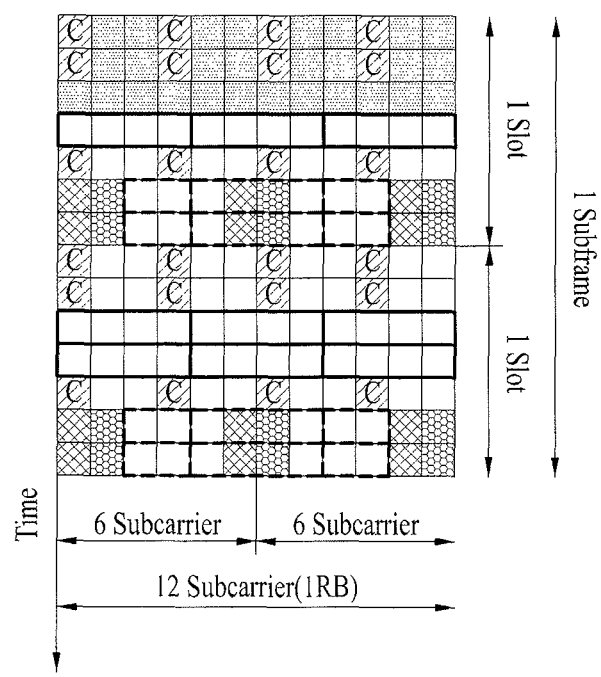

In FIG. 15, an example of setting CSI-RS RE groups on four contiguous subcarriers is shown. It can be seen from FIG. 15 that CSI-RS RE groups are not defined on OFDM symbols in which CRSs and DMRSs are arranged.

Figure 16:
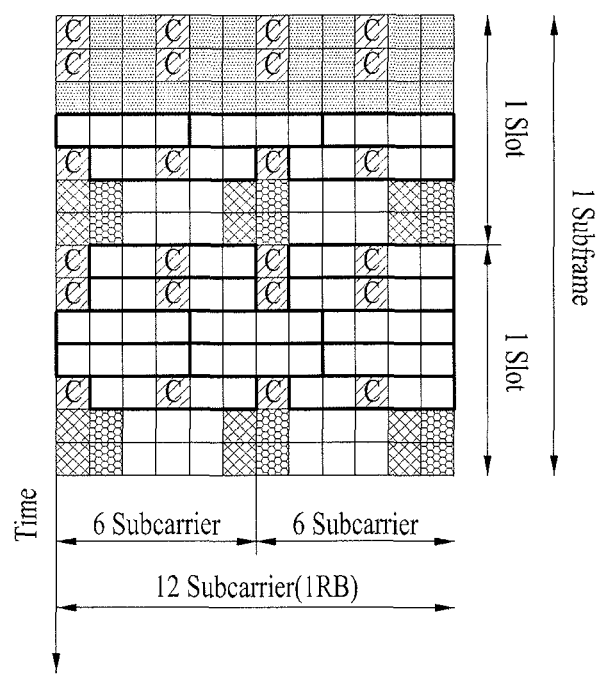

In FIG. 16, an example of setting CSI-RS RE groups on four contiguous subcarriers is shown. In FIG. 16, it is noted that CSI-RSs are not transmitted at CRS RE locations. It can be seen from FIG. 16 that CSI-RS RE groups are not defined on OFDM symbols in which DMRSs are arranged.

The CSI-RS RE groups shown in FIGS. 12 to 16 are used to transmit CSI-RS antenna port groups by a single cell. For example, if one cell performs transmission using two CSI-RS antenna ports and a CSI-RS RE group size is 2, CSI-RS REs for the two CSI-RS antenna ports may be mapped to one CSI-RS RE group. If one cell performs transmission using four CSI-RS antenna ports and a CSI-RS RE group size is 4 REs, CSI-RS REs for the four CSI-RS antenna ports may be mapped to one CSI-RS RE group. If one cell performs transmission using eight CSI-RS antenna ports and a CSI-RS RE group size is 4 REs, CSI-RS REs for the eight CSI-RS antenna ports may be mapped to two CSI-RS RE groups. The two CSI-RS RE groups do not need to be contiguously arranged and may be arranged in certain CSI-RS RE groups in the RBs.

In simple channel estimation implementation, the CSI-RS RE pattern may be equally configured over the entire bandwidth (in a subframe which does not include at least a primary broadcast channel, a primary synchronization channel and a secondary synchronization channel). Mapping of CSI-RS antenna ports to a smaller number of CSI-RS groups is important in case where a cell supports a transmission diversity scheme for a certain base station. If CSI-RS REs are distributed into a plurality of CSI-RS groups, a plurality of SFBC time-space coded RE pairs for the transmission diversity scheme may be broken. This is because the SFBC and SFBC-FSTD transmission diversity schemes have the base RE block to which space-frequency coding and/or antenna-selective/frequency-selective diversity is applied. Transmission of CSI-RSs in specific REs may damage diversity base blocks and lower performance of the transmission diversity scheme.

Among the embodiments of the CSI-RS RE group proposed by the present invention, the embodiments of the CSI-RS RE groups shown in FIGS. 12, 14 and 16 are more preferable than the other embodiments in that none of CSI-RS REs mapped to one CSI-RS RE group damage one or more SFBC RE pairs. However, in the present invention, the CSI-RS RE groups defined in FIGS. 13 and 15 are not excluded.

Figure 17:
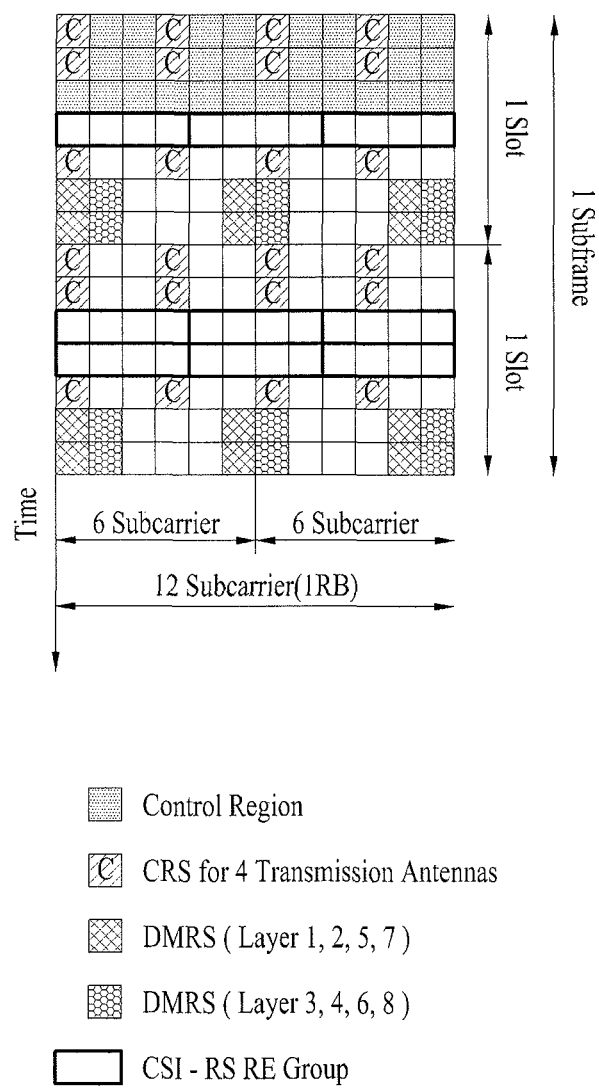
FIGS. 17 to 19 are diagrams illustrating setting of a CSI-RS RE group in consideration of a transmission diversity RE pair.

Referring to FIG. 17, in OFDM symbols which do not include CRSs or DMRSs, one CSI-RS RE group (each including four REs) in one RB may be defined by four contiguous REs. It is noted that CSI-RS RE groups do not overlap each other. The CSI-RS RE groups are equal to base RE group(s) to which transmission diversity is applied. If each CSI-RS RE group has only two REs, the CSI-RS RE group may be defined by two contiguous REs.

Figure 18:
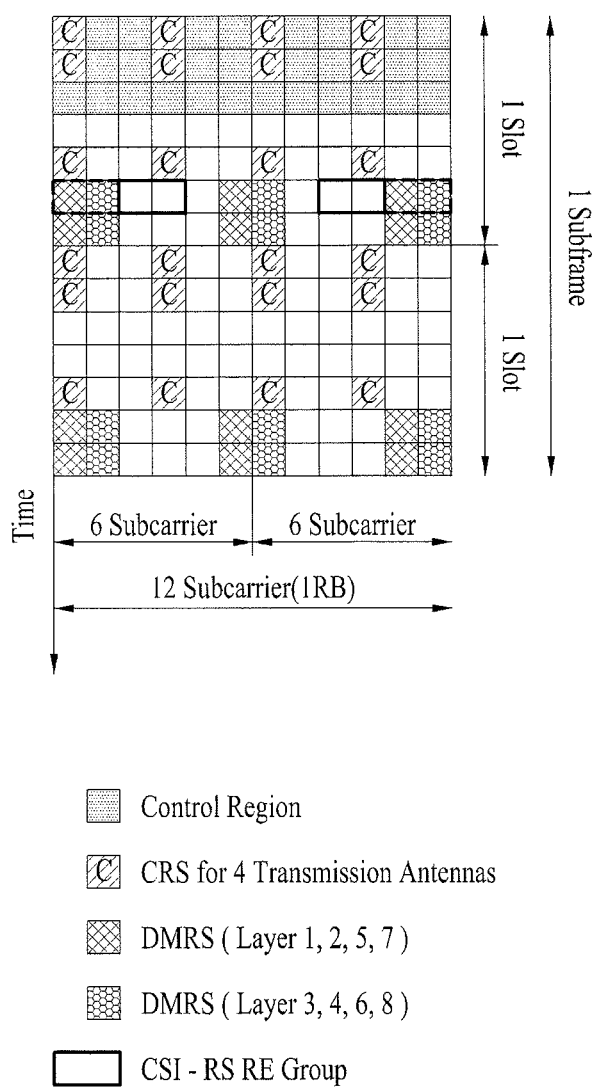

As shown in FIG. 18, if a CSI-RS RE group includes four REs, the CSI-RS RE group located on the same OFDM symbols as the DMRS REs may not include four contiguous available REs belonging to one transmission diversity base RE group. In this case, the CSI-RS RE group located on the same OFDM symbols as the DMRS REs may be defined as two sets each including two REs, and each set may include two contiguous REs belonging to different transmission diversity RE groups. In FIG. 18, one bold solid-line rectangular denotes a set including two REs and two bold solid-line rectangular groups configure one CSI-RS RE group. In such definition of the CSI-RS RE group, a CSI-RS RE group including four REs defines two RE sets, and Alamouti-coding (SFBC) and antenna/frequency-selective diversity may be used over two RE sets. This is because, among four contiguous REs (four contiguous REs including one bold dotted-line rectangular and one bold solid-line rectangular, two transmission diversity base blocks each including four contiguous REs are shown in FIG. 18), first two REs (e.g., a bold dotted-line rectangular) are mapped to common antenna ports 0 and 2 coded using the SFBC and next two REs (e.g., a bold solid-line rectangular) are mapped to common antenna ports 1 and 3 coded using the SFBC. That is, in the transmission diversity base block including four contiguous REs, if the CSI-RS REs are mapped to the first two REs, the first two REs may not be used for the common antenna ports 0 and 2. Similarly, in the transmission diversity base block including four contiguous REs, if the CSI-RS REs are mapped to the last two REs, the last two REs may not be used for the common antenna ports 1 and 3. Accordingly, if the last two REs of one transmission diversity base block (first four contiguous REs) and the first two REs of another transmission diversity base block (next four contiguous REs) are taken, it is possible to configure a virtual transmission diversity base block using four REs. The definition of the CSI-RS RE group of the OFDM symbols including the DMRSs is important in that it is possible to effectively keep balance of puncturing of all common antenna ports 0, 1, 2 and 3 when CSI-RS REs are mapped to specific types of CSI-RS RE groups. Puncturing indicates that, if CSI-RSs are transmitted on specific REs, the REs may not be used for the common antenna ports.

Figure 19:
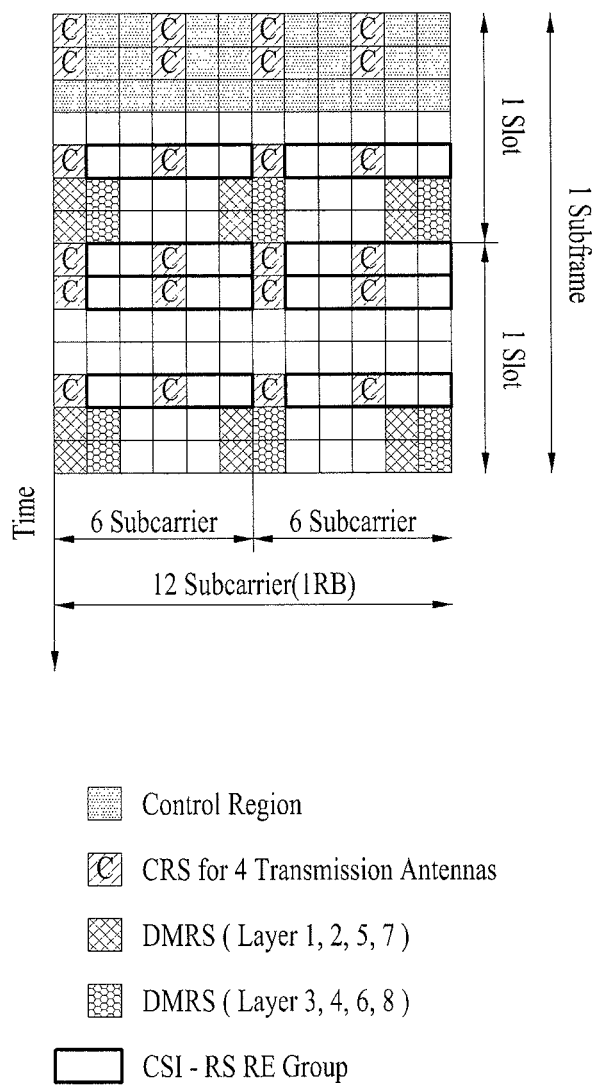

As shown in FIG. 19, if a CSI-RS RE group includes four REs, a CSI-RS RE group located on the same OFDM symbols as CRS REs may not include four contiguous available REs belonging to one transmission diversity base RE group. On OFDM symbols including CRSs, CSI-RS RE groups may be conceptually configured as shown in FIG. 19. By such a CSI-RS RE group configuration, it is possible to effectively keep balance of puncturing of common antenna ports.

Figure 20:
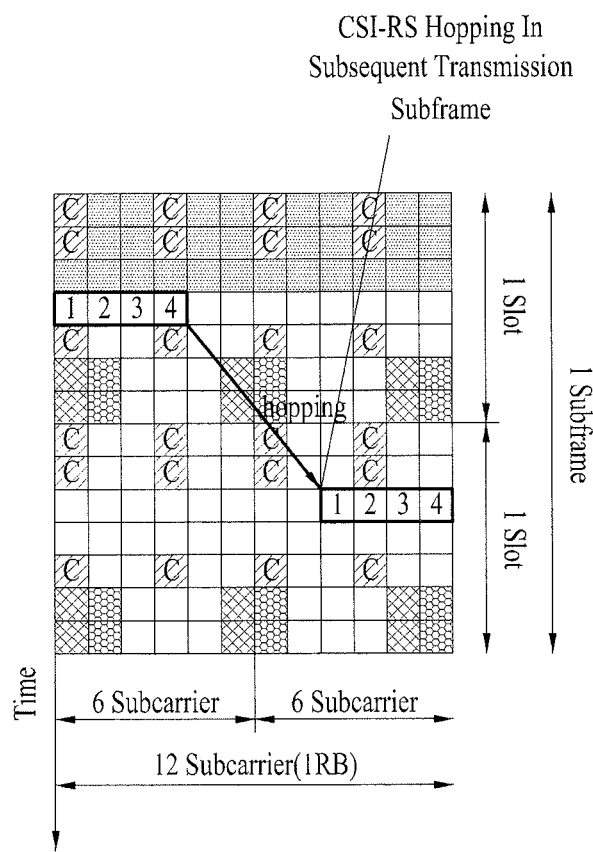
FIG. 20 is a diagram illustrating hopping of a CSI-RS RE group.

As shown in FIG. 20, CSI-RS antenna port REs mapped to CSI-RS RE groups may hop (change or randomization) within each CSI-RS transmission subframe. In FIG. 20, "1", "2", "3", and "4" denote REs used for CSI-RS antenna ports 0, 1, 2 and 3.

Hopping may be performed using various methods.

For example, time and frequency shift of a CSI-RS RE group is defined in each transmission subframe. A CSI-RS RE group hopping pattern may be repeated once in one radio frame (10 subframes) or N radio frames (10×N subframes, N≥2). N may be, for example, 4, and four radio frames correspond to a period in which a primary broadcast channel is transmitted.

Figure 21:
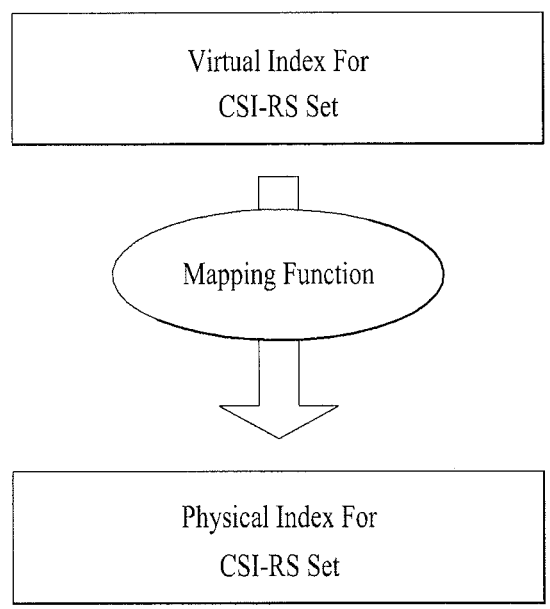
FIG. 21 is a diagram illustrating a function for mapping virtual CSI-RS group indexes to physical CSI-RS group indexes.

As another example, a virtual CSI-RS group index is defined, and a hopping (randomization or permutation) mapping function for mapping the virtual CSI-RS group index to a physical CSI-RS group index is defined (see FIG. 21). In such a mapping function, a cyclic virtual index shifting method, a subblock interleaver, or a Quadratic Permutation Polynomial interleaver may be used.

In the cyclic virtual index shifting method, a CSI-RS group is mapped to a virtual index. In association with the cyclic virtual index shifting, a case where a UE operates according to a Cooperative Multi-Point (CoMP) transmission scheme may be considered. The CoMP transmission scheme is an improved MIMO transmission scheme applicable to a multi-cell environment, which can improve throughput of a UE located on a cell edge and increase system performance. A joint processing cooperative beamforming scheme may be applied. In the CoMP transmission scheme, a UE which receives data by multi-cell cooperation may transmit information on channels from the multi-cell to the UE to each cell belonging to the multi-cell (CoMP transmission cluster). Virtual indexes may be set so as not to overlap each other between cells belonging to one CoMP transmission cluster. Cells belonging to different CoMP clusters may use the same virtual indexes, but each CoMP cluster may cyclically shift indexes when the virtual indexes are mapped to physical indexes. Therefore, orthogonal CSI- RS RE group mapping within one CoMP cluster is possible. Non-orthogonal CSI-RS RE group mapping between different CoMP clusters is possible and different CSI-RS RE group mapping between different CoMP clusters is possible by cyclic shifting of virtual indexes.

Next, a block interleaver may be used in order to randomize CSI-RS RE group mapping between cells. CSI-RS RE group indexes may be defined by $v_k$ (k=1, 2, . . . , and L) and L denotes an interleaver input size. A block interleaver is configured by a matrix, and input information may be written in the interleaver row by row, and output information may be read from the interleaver column by column. That is, when information is written in an interleaver, information is written in one row while increasing a column number and information is written in a next row if one row is filled. When information is read from an interleaver, information is read from one column while increasing a row number and information is read from a next column when all information is read from one column. Columns of a matrix configuring the block interleaver may be permuted. Alternatively, the block interleaver may be configured in a manner of writing information column by column and reading information row by row.

If the above-described block interleaver is used, CSI-RS group indexes may be efficiently randomized. The following equation shows an example of a block interleaver matrix in which CSI-RS indexes are input row by row.

$$D = \begin{bmatrix} v_1 & v_2 & \cdots & v_N \\ v_{N+1} & v_{N+2} & \cdots & v_{2N} \\ \vdots & \vdots & \ddots & \vdots \\ v_{(M-1)N+1} & v_{(M-1)N+2} & \cdots & v_{MN} \end{bmatrix}$$ Equation 28

In Equation 28, M is a largest integer satisfying L≤MN. In the case of MN>L, $N_D$=MN−L may be defined and $v_{L+j}$=[NULL] (j=1, 2, . . . , $N_D$). That is, if the number L of CSI-RS group indexes does not accurately correspond to the size of the block interleaver matrix, a null value may be padded into elements of the number $N_D$ obtained by subtracting the number L of CSI-RS group indexes from the size MN of the interleaver. The null value is ignored upon the output from the block interleaver. That is, the CSI-RS group indexes are read from the interleaver except for the null value. Column permutation of the block interleaver may be defined as follows.

$$\pi = \{\pi(i)=j\}, i, j=1, 2, \ldots, N$$ Equation 29

A matrix subjected to column permutation by Equation 29 may be expressed as follows.

$$F = \begin{bmatrix} v_{\pi(1)} & v_{\pi(2)} & \cdots & v_{\pi(N)} \\ v_{\pi(1)+N} & v_{\pi(2)+N} & \cdots & v_{\pi(N)+N} \\ \vdots & \vdots & \ddots & \vdots \\ v_{\pi(1)+(M-1)N} & v_{\pi(2)+(M-1)N} & \cdots & v_{\pi(N)+MN} \end{bmatrix}$$ Equation 30

The block interleaver output may be read column by column. In Equation 30, the output starts from $v_{\pi(1)}$ of a first column and the output index sequence may be $\{v_{\pi(1)+N}, \ldots, v_{\pi(1)+(M-1)N}, v_{\pi(2)}, \ldots, v_{\pi(N)+MN}\}$. If the null value is present, the null value may be ignored when reading as described above.

Different CoMP clusters may use different column permutations or different cyclic shift values may be applied before mapping the CSI-RS group indexes to the interleaver matrix. Thus, different CSI-RS group index randomizations may be applied to different CoMP clusters.

Figure 22:
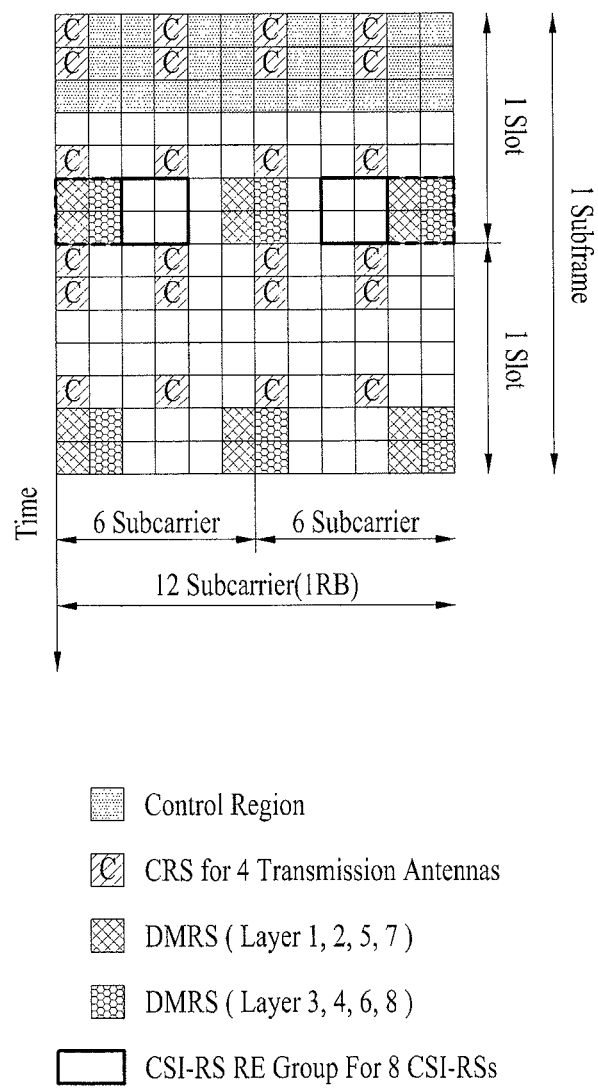
FIGS. 22 and 23 are diagrams showing examples of a CSI-RS RE group in case of eight transmission antennas.

FIG. 22 shows an example of a CSI-RS RE group in the case of eight transmission antennas. In the case of eight transmission antennas, eight CSI-RSs need to be transmitted to a UE. In the present embodiment, when a normal CP subframe is configured in a cell, a CSI-RS RE group having four SFBC-encoded RE pairs is proposed. One CSI-RS RE group includes two RE sets and one RE set includes two RE pairs (that is, four REs). That is, within one RE set, four REs are contiguous in the time and frequency domains (a bold solid-line square of FIG. 22 corresponds to one RE set), and two RE sets may be separated at an interval of four subcarriers in the frequency domain. Thus, from the view point of a transmitter, the same CSI-RS RE group pattern may be used in OFDM symbols with DMRSs and OFDM symbols without CRSs or DMRSs. RE locations surrounded by a bold dotted line of FIG. 22 are to effectively keep balance of puncturing of the common antenna ports in a transmission diversity base block, similar to the description of FIG. 18.

In the present embodiment, the CSI-RS RE groups are shifted in the time and/or frequency domain in each cell. That is, a CSI-RS RE group pattern may be used in one cell and time and/or frequency shifted pattern of the CSI-RS RE group pattern may be used in another cell.

Figure 23:
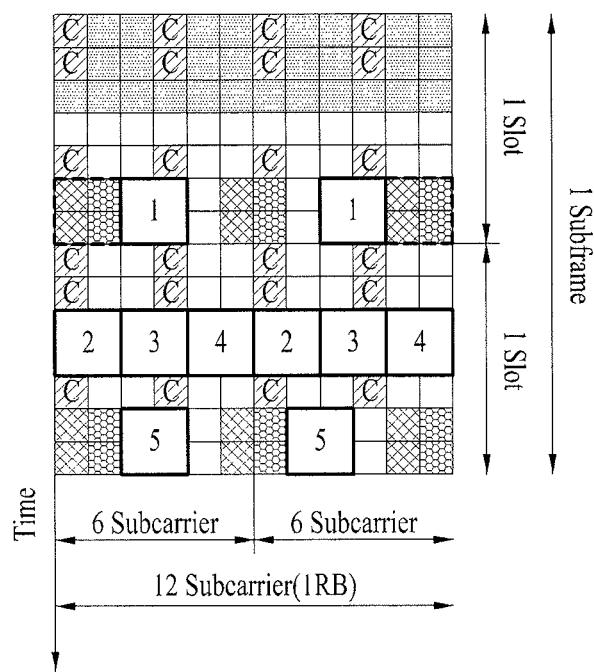

Each cell may hop between candidates of the CSI-RS RE group location at every transmission time, for CSI-RS transmission. The examples of the candidates of the CSI-RS RE group location is shown in FIG. 23. That is, two bold solid-line squares denoted by 1 of FIG. 23 represent one candidate location of the CSI-RS RE group location and, similarly, two bold solid-line squares denoted by 2, 3, 4 or represent one candidate location of the CSI-RS RE group location. For example, in one RB (14 OFDM symbols in the time domain×12 subcarriers in the frequency domain), the CSI-RS RE group location denoted by 1 corresponds to third, fourth, ninth and tenth subcarrier locations in the sixth and seventh OFDM symbols, the CSI-RS RE group location denoted by 2 corresponds to the first, second, seventh and eighth subcarrier locations in the tenth and eleventh OFDM symbols, the CSI-RS RE group location denoted by 3 corresponds to the third, fourth, ninth and tenth subcarrier locations in the tenth and eleventh OFDM symbols, the CSI-RS RE group location denoted by 4 corresponds to the fifth, sixth, eleventh and twelfth subcarrier locations in the tenth and eleventh OFDM symbols, and the CSI-RS RE group location denoted by 5 corresponds to the third, fourth, ninth and tenth subcarrier locations in the thirteenth and fourteenth OFDM symbols. Accordingly, five cells may simultaneously use different CSI-RS RE group patterns.

Figure 24:
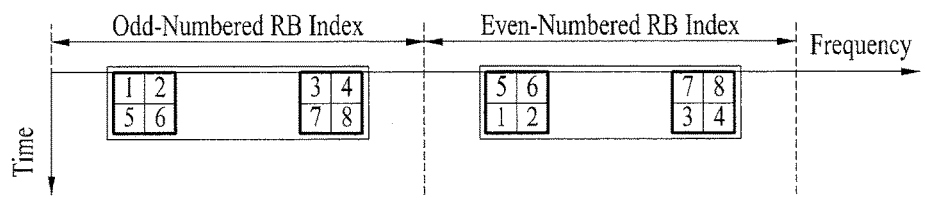
FIG. 24 is a diagram illustrating a method of mapping CSI-RSs in case of eight transmission antennas.
Figure 24:
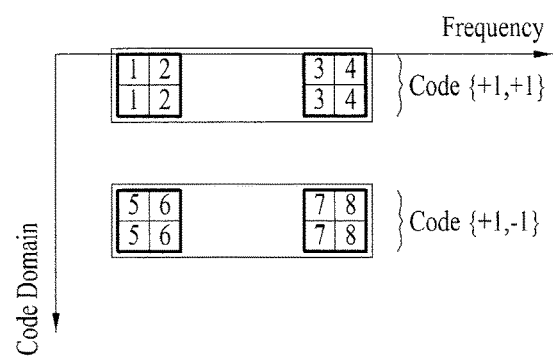
Figure 24:

From the viewpoint of a transmission antenna, transmit power may be reallocated in the frequency domain, but may not be reallocated in the time domain. In other words, if total transmit power is restricted, specific REs of one OFDM symbol may borrow power from the other REs within the OFDM symbol so as to realize power boosting. If CSI-RSs for different antenna ports are multiplexed and orthogonalized, the orthogonality may not be maintained when different power boosting are applied to each CSI-RSs. In order to maintain orthogonality, all the CSI-RSs need to be transmitted on the same OFDM symbol such that the CSI-RSs borrow the same power from the other REs so as to realize power boosting. If the CSI-RS RE group is defined as shown in FIG. 23, two methods for mapping CSI-RS antenna ports may be considered. Examples of the two methods are shown in FIGS. 24 (a) and 24(b).

In FIG. 24(a), two bold solid-line squares within one RB show one CSI-RS RE group. For clarity, the other REs are not shown. According to a first mapping method shown in FIG. 24(a), CSI-RS mapping may be switched between RBs and all the CSI-RS antenna ports may be effectively mapped on the same OFDM symbol. In detail, within the CSI-RS RE group on an odd-numbered RB index, CSI-RSs for four antenna ports are mapped to a first OFDM symbol (e.g., 1,2/3,4) and CSI-RSs for the remaining four antenna ports are mapped to a second OFDM symbol (e.g., 5,6/7,8). The mapping of the CSI-RSs on an even-numbered RB index is performed in a manner inverse to that of the odd-numbered RB index in the time domain and CSI-RS insertion patterns are swapped between OFDM symbols. That is, within the CSI-RS RE group on an even-numbered RB index, CSI-RSs for four antenna ports are mapped to a first OFDM symbol (e.g., 5,6/7,8) and CSI-RSs for the remaining four antenna ports are mapped to a second OFDM symbol (e.g., 1,2/3,4). Thus, the CSI-RSs for all the eight transmission antenna ports may be mapped in one OFDM symbol (over two RBs).

In FIG. 24(b), a horizontal axis denotes a frequency domain and a vertical axis denotes a code resource domain. Although two CSI-RS RE groups (one CSI-RS RE group includes two bold solid-line squares) are shown in FIG. 24(b) in order to describe the case where the CSI-RS RE groups use different code resources, it is noted that the CSI-RS RE groups are present on the same time/frequency location. According to a second mapping method shown in FIG. 24(b), four CSI-RSs (1,2/3,4) may be multiplied by a first orthogonal code $\{+1, +1\}$ and arranged on one OFDM symbol using a FDM scheme and the remaining four CSI-RSs (5,6/7,8) may be multiplied by a second orthogonal code $\{+1, -1\}$ and arranged on the same OFDM symbol and subcarrier. Thus, all CSI-RSs for eight antenna ports on the same OFDM symbol within one RB may be transmitted. Since the number of REs available in CSI-RS transmission on one OFDM symbol is 4, two sets of CSI-RSs may be subjected to CDM using time-spread orthogonal codes. Multiplication of orthogonal codes over the time domain may be referred to as CDM-T multiplexing. As the orthogonal codes, for example, Walsh-Hadamard codes may be used. Four RE groups multiplexed using the CDM scheme may be generated and, in each of the four RE groups, CSI-RSs for antenna ports may be multiplexed using a FDM scheme.

Figure 25:
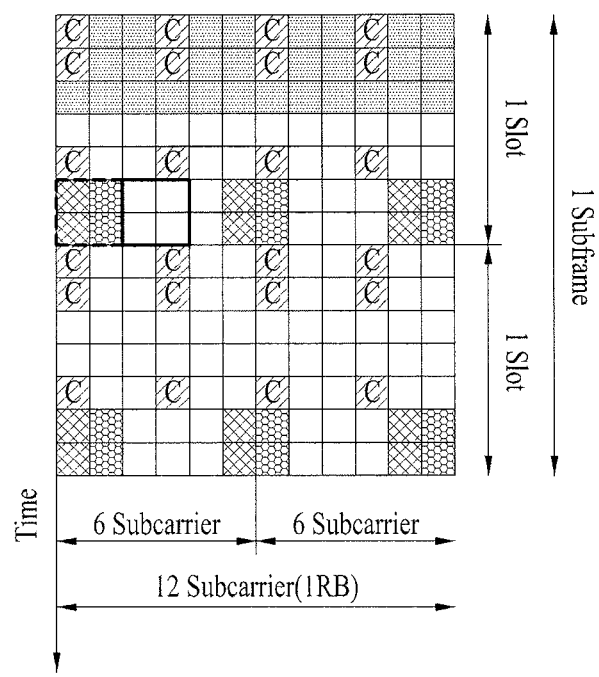
FIGS. 25 and 26 are diagrams showing examples of a CSI-RS RE group in case of four transmission antennas.
Figure 26:
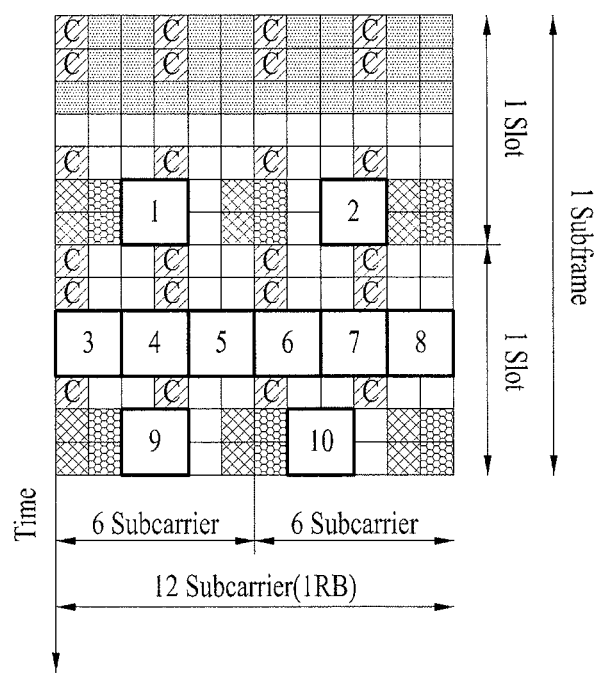
Figure 27:
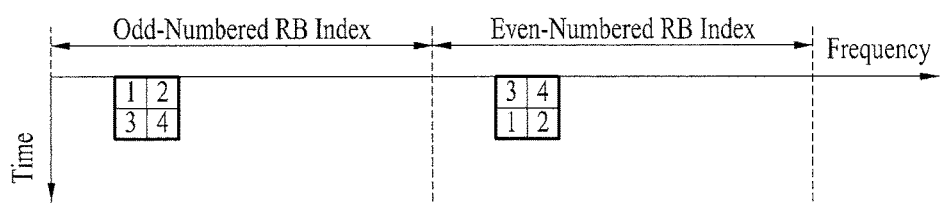
FIG. 27 is a diagram illustrating a method of mapping CSI-RSs in case of four transmission antennas.
Figure 27:
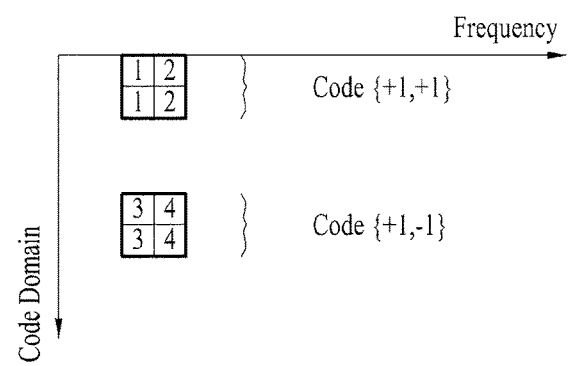
Figure 27:

FIGS. 25 to 27 show examples of CSI-RS multiplexing when four CSI-RSs are transmitted from a single cell. Multiplexing of four CSI-RSs may be a subset of multiplexing of eight CSI-RSs. That is, for multiplexing of eight CSI-RSs, as described in FIG. 23, eight REs (two bold solid-line squares) may be used, and a subset (four REs) may be used for multiplexing of four CSI-RSs. For example, four CSI-RSs may be mapped to four RE units (one bold solid-line square of FIGS. 25 to 27) contiguous in the time and frequency domain. A CSI-RS RE group in which four CSI-RSs are multiplexed may be defined such that two SFBC RE pairs (where one SFBC RE pair is two REs contiguous in the frequency domain) are contiguous in the time domain. That is, four RE groups (one bold solid-line square) contiguous in the time/frequency domain may be defined as one CSI-RS RE group. As shown in FIG. 26, 10 CSI-RS RE group patterns may be defined and one of the 10 CSI-RS RE group patterns may be used for transmission of four CSI-RSs. As shown in FIG. 27(a), CSI-RS mapping may be performed such that CSI-RSs are swapped between an odd-numbered RB and an even-numbered RB in the time domain. Thus, all CSI-RSs for four antenna ports may be transmitted on the same OFDM symbols over two RBs and power reallocation may be sufficiently utilized. As shown in FIG. 27(b), in CSI-RS mapping, two CSI-RSs may be multiplexed in one CSI-RS RE group (a bold solid-line square) using an FDM scheme, and may be multiplied by orthogonal code resources $\{+1, +1\}$ and $\{+1, -1\}$ of a length of 2 over the time domain such that two CSI-RSs are multiplexed using a CDM-T scheme, thereby multiplexing 4 CSI-RSs in one CSI-RS RE group. The details of the setting of the CSI-RS RE group and multiplexing of the plurality of CSI-RSs in the CSI-RS RE group can be described by the same principle as the above-described embodiments and the repeated description will be omitted for clarity.

In the present embodiment, the CSI-RS RE group is shifted in the time and/or frequency domain in each cell. That is, a CSI-RS RE group pattern may be used in one cell and time and/or frequency shifted pattern of the CSI-RS RE group pattern may be used in another cell. Each cell may hop between candidates of the CSI-RS RE group location at every transmission time, for CSI-RS transmission. In the examples of the candidates of the CSI-RS RE group location, as shown in FIG. 26, and 10 candidates of the CSI-RS RE group location may be present. Accordingly, ten cells may simultaneously use different CSI-RS RE group patterns.

Figure 28:
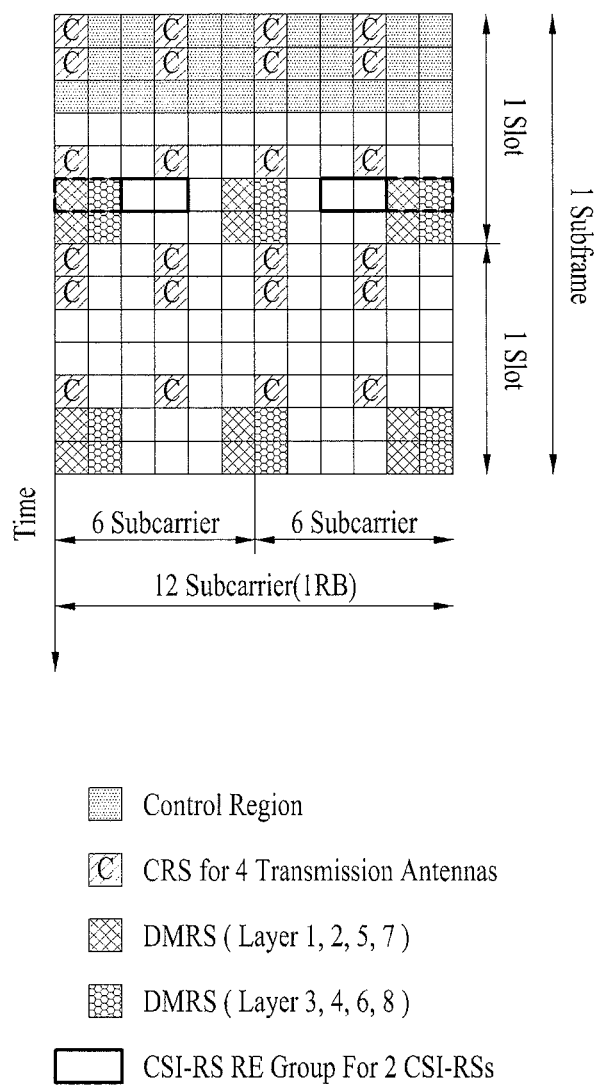
FIGS. 28 and 29 are diagrams showing the other examples of a CSI-RS RE group in case of four transmission antennas.
Figure 29:
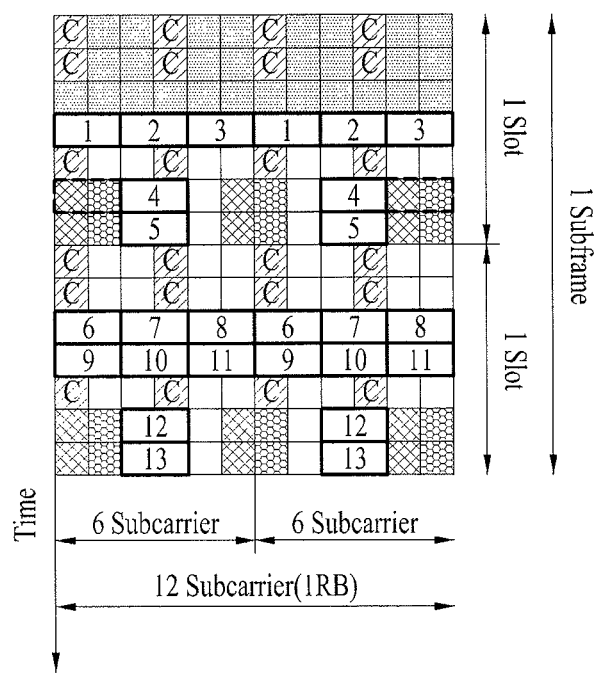
Figure 30:
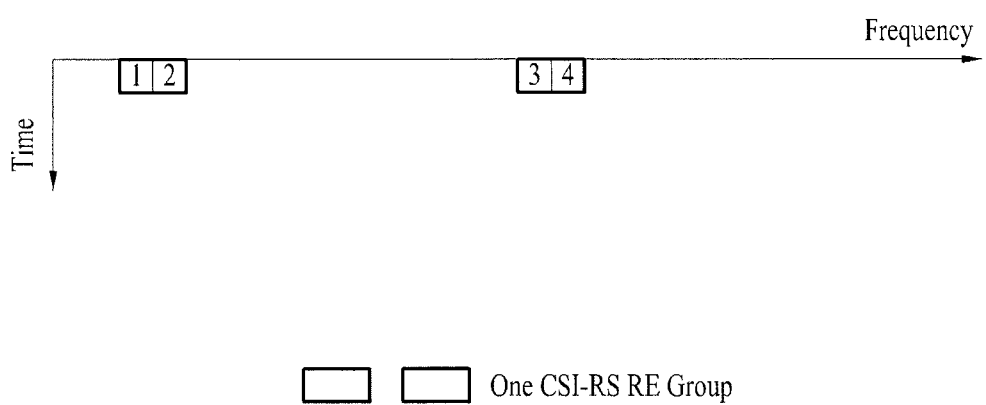
FIG. 30 is a diagram illustrating a method of mapping CSI-RSs in case of four transmission antennas.

FIGS. 28 to 30 show the other examples of CSI-RS multiplexing when four CSI-RSs are transmitted from a single cell. Multiplexing of four CSI-RSs may be a subset of multiplexing of eight CSI-RSs. That is, for multiplexing of eight CSI-RSs, as described in FIG. 23, eight REs (two bold solid-line squares) may be used, and a subset (four REs) may be used for multiplexing of four CSI-RSs. For example, as shown in FIG. 28, four CSI-RSs may be mapped to four CSI-RS REs present on the same OFDM symbol. Four CSI-RS REs may be defined such that two REs (SFBC RE pair) contiguous in the frequency domain, which are used as an SFBC pair, are separated by four subcarriers on the same OFDM symbol. The four CSI-RS REs may configure one CSI-RS RE group. Thus, as shown in FIG. 29, 13 CSI-RS RE group patterns may be defined and, for transmission of 4 CSI-RSs, one CSI-RS RE group of 13 CSI-RS RE group patterns may be used. AS shown in FIG. 30, CSI-RSs for four antenna ports within one CSI-RS RE group may be multiplexed using an FDM scheme so as to be transmitted. The details of the setting of the CSI-RS RE group and multiplexing of the plurality of CSI-RSs in the CSI-RS RE group can be described by the same principle as the above-described embodiments and the repeated description will be omitted for clarity.

In the present embodiment, the CSI-RS RE group is shifted in the time and/or frequency domain in each cell. That is, a CSI-RS RE group pattern may be used in one cell and time and/or frequency shifted pattern of the CSI-RS RE group pattern may be used in another cell. Each cell may hop between candidates of the CSI-RS RE group location at every transmission time, for CSI-RS transmission. In the examples of the candidates of the CSI-RS RE group location, as shown in FIGS. 29, and 13 candidates of the CSI-RS RE group location may be present. Accordingly, 13 cells may simultaneously use different CSI-RS RE group patterns.

Figure 31:
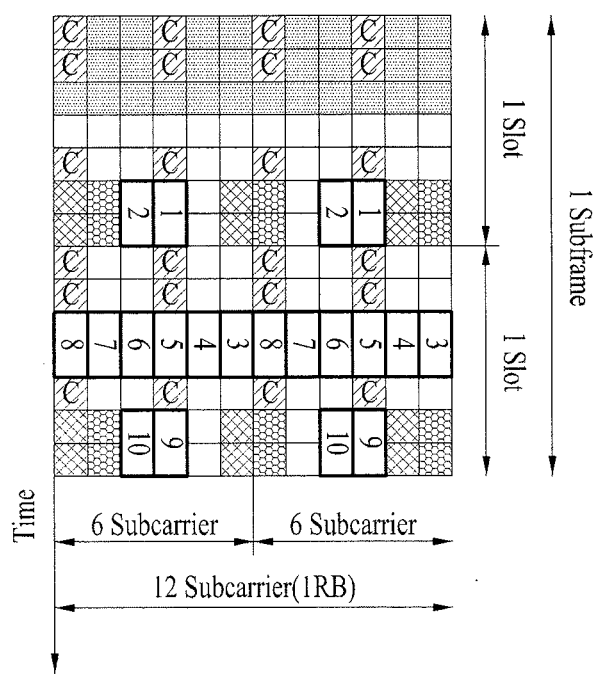
FIG. 31 is a diagram showing another example of a CSI-RS RE group in case of four transmission antennas.

As described above, the CSI-RS RE group for four CSI-RS antenna ports may be set to a predetermined subset of a CSI-RS RE group pattern (e.g., a CSI-RS RE pattern of FIG. 23) for eight CSI-RS transmission antenna ports and the subset may be set as a set of various RE locations. For example, as shown in FIG. 31, the CSI-RS RE group for four CSI-RS antenna ports may be defined as two REs on two contiguous OFDM symbols at a predetermined subcarrier location of the CSI-RS RE group pattern (e.g., a CSI-RS RE pattern of FIG. 23) for eight CSI-RS antenna ports and two REs on two contiguous OFDM symbols at another subcarrier location (e.g., a subcarrier location separated from the predetermined subcarrier location by five subcarriers). One CSI-RS RE group includes four REs and CSI-RSs for four CSI-RS antenna ports may be transmitted one by one in each RE. In this case, four CSI-RSs may be multiplexed using a TDM/FDM scheme. Alternatively, in one CSI-RS RE group, CSI-RSs for two CSI-RS antenna ports may be multiplexed using a CDM-T scheme using orthogonal codes of a length of 2 over two REs present on the same subcarrier, and the CSI-RSs for the remaining two CSI-RS antenna ports may be multiplexed using a CDM-T scheme using orthogonal codes of a length of 2 over two REs present on another subcarrier. In the CSI-RS RE group for four CSI-RS antenna ports shown in FIG. 31, 10 candidates of CSI-RS RE group may be present within one RB. One cell may select one of the 10 candidates of CSI-RS RE group location and another cell may select another candidate such that each cell transmits the CSI-RSs for four CSI-RS antenna ports without overlapping.

Figure 32:
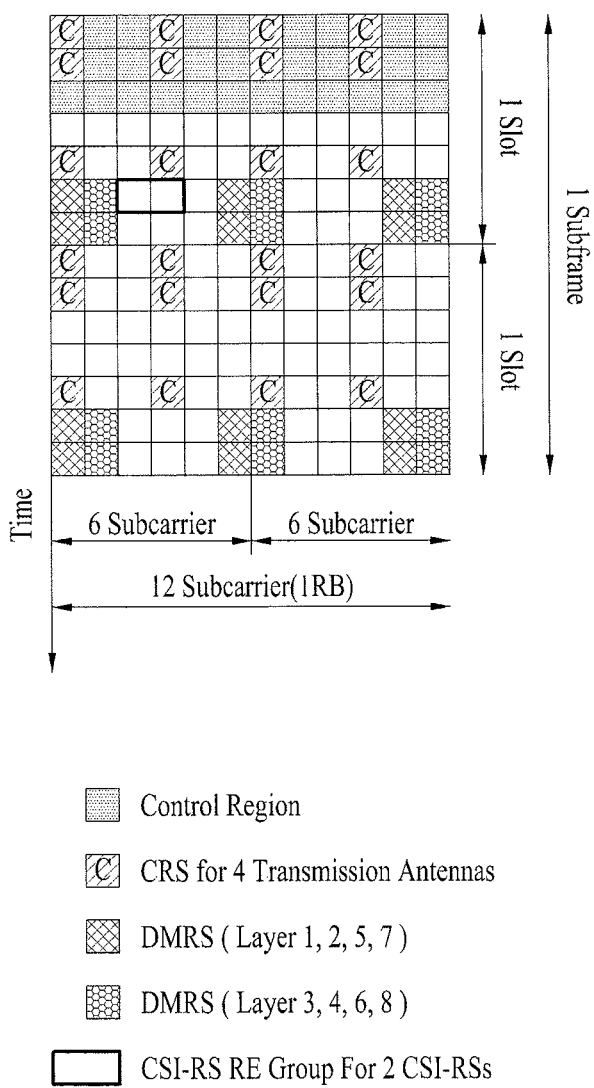
FIGS. 32 and 33 are diagrams showing examples of a CSI-RS RE group in case of two transmission antennas.
Figure 33:
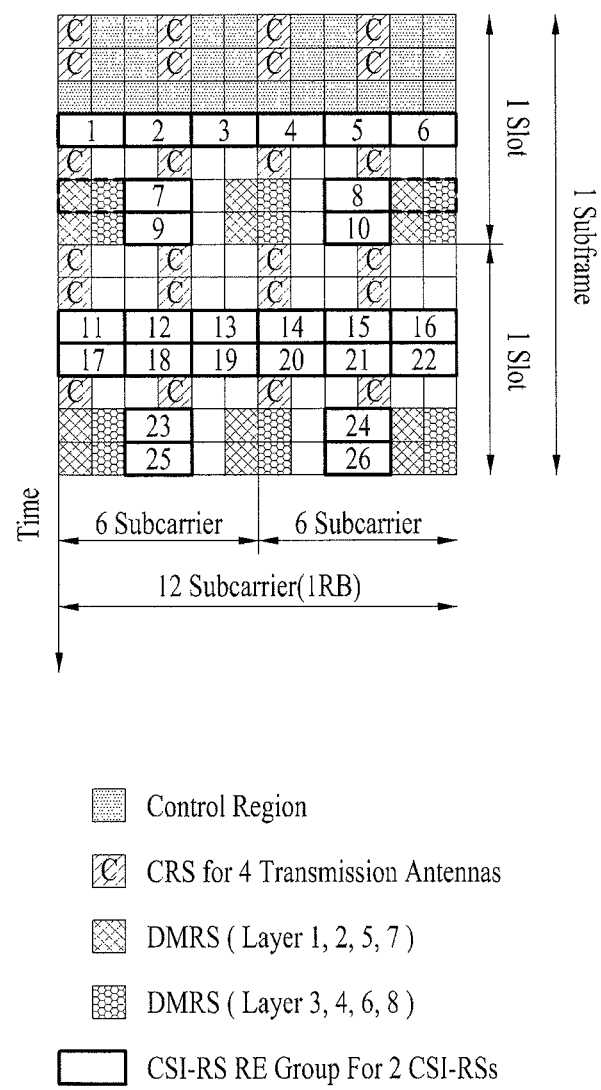

FIGS. 32 and 33 show examples of CSI-RS multiplexing when two CSI-RSs are transmitted from a single cell. Multiplexing of two CSI-RSs may be a subset of multiplexing of eight CSI-RSs. That is, for multiplexing of eight CSI-RSs, as described in FIG. 23, eight REs (two bold solid-line squares) may be used, and a subset (two REs) may be used for multiplexing of two CSI-RSs. For example, as shown in FIG. 32, two CSI-RSs may be defined as two REs (SFBC RE pair) contiguous in the frequency domain, which are used as an SFBC pair. The two CSI-RS REs may configure one CSI-RS RE group. Thus, as shown in FIG. 33, 26 CSI-RS RE group patterns may be defined and, for transmission of 2 CSI-RSs, one CSI-RS RE group of 26 CSI-RS RE group patterns may be used. CSI-RSs for two antenna ports within one CSI-RS RE group may be multiplexed using an FDM scheme so as to be transmitted. The details of the setting of the CSI-RS RE group and multiplexing of the plurality of CSI-RSs in the CSI-RS RE group can be described by the same principle as the above-described embodiments and the repeated description will be omitted for clarity.

In the present embodiment, the CSI-RS RE group is shifted in the time and/or frequency domain in each cell. That is, a CSI-RS RE group pattern may be used in one cell and time and/or frequency shifted pattern of the CSI-RS RE group pattern may be used in another cell. Each cell may hop between candidates of the CSI-RS RE group location at every transmission time, for CSI-RS transmission. In the examples of the candidates of the CSI-RS RE group location, as shown in FIG. 33, and 26 candidates of the CSI-RS RE group location may be present. Accordingly, 26 cells may simultaneously use different CSI-RS RE group patterns.

Figure 34:
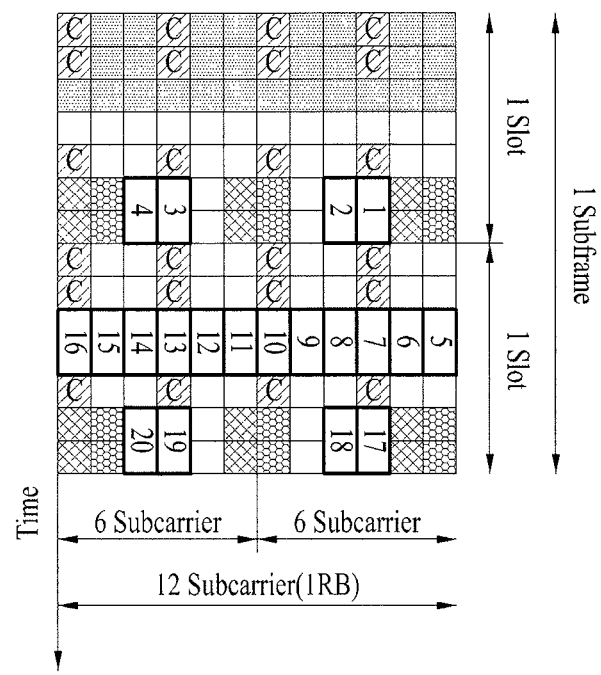
FIG. 34 is a diagram showing another example of a CSI-RS RE group in case of two transmission antennas.

As described above, the CSI-RS RE group for two CSI-RS antenna ports may be set to a predetermined subset of a CSI-RS RE group pattern (e.g., a CSI-RS RE pattern of FIG. 23) for eight CSI-RS transmission antenna ports and the subset may be set as a set of various RE locations. For example, as shown in FIG. 34, the CSI-RS RE group for two CSI-RS antenna ports may be defined as two REs on two contiguous OFDM symbols at a predetermined subcarrier location of the CSI-RS RE group pattern (e.g., a CSI-RS RE pattern of FIG. 23) for eight CSI-RS antenna ports. One CSI-RS RE group includes two REs and CSI-RSs for two CSI-RS antenna ports may be transmitted one by one in each RE. In this case, two CSI-RSs may be multiplexed using a TDM/FDM scheme. Alternatively, in one CSI-RS RE group, CSI-RSs for two CSI-RS antenna ports may be multiplexed using a CDM-T scheme using orthogonal codes of a length of 2 over two REs present on the same subcarrier. In the CSI-RS RE group for two CSI-RS antenna ports shown in FIG. 34, 20 candidates of CSI-RS RE group may be present within one RB. One cell may select one of the 20 candidates of CSI-RS RE group location and another cell may select another candidate such that each cell transmits the CSI-RSs for two CSI-RS antenna ports without overlapping.

Figure 35:
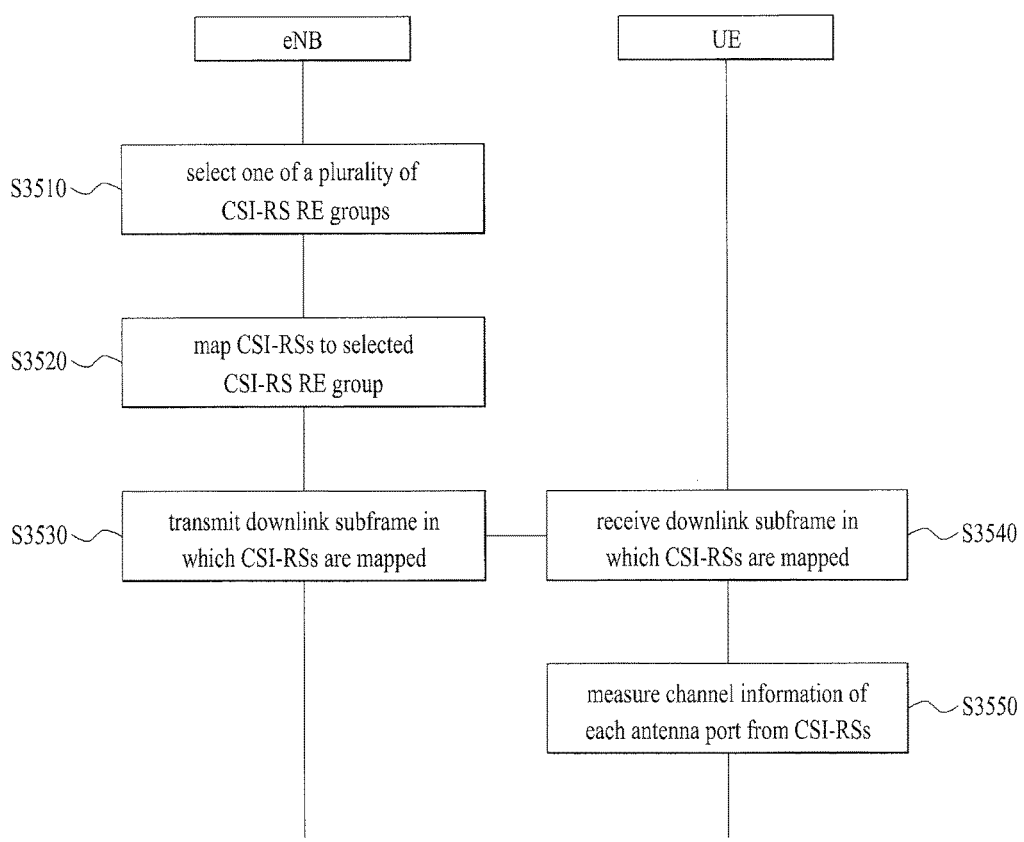
FIG. 35 is a flowchart illustrating a CSI-RS transmission method and a channel information acquisition method.

FIG. 35 is a diagram illustrating a CSI-RS transmission method and a channel information acquisition method.

In step S3510, a base station may select one of a plurality of CSI-RS RE groups defined on a data region of a downlink subframe, for CSI-RS transmission for 8 or less antenna ports.

The plurality of CSI-RS RE groups may be defined such that a transmission diversity RE pair (e.g., an SFBC pair) for data transmitted on a downlink subframe is not broken. For example, if a downlink subframe has a normal CP configuration, the number of CSI-RS RE groups may be five with respect to eight transmission antennas within one RB, as shown in FIG. 23. That is, each of the plurality of CSI-RS RE groups may be defined at two contiguous subcarrier locations of two contiguous OFDM symbols and two different contiguous subcarrier locations separated from the above two contiguous subcarrier locations by four subcarriers, on REs in which CRSs and DMRSs are not arranged. The plurality of CSI-RS RE groups may be defined as the RE locations where one CSI-RS RE group is shifted in the time and frequency domain with respect to another CSI-RS RE group.

The plurality of CSI-RS RE groups to which the CSI-RSs for four antenna ports are mapped may be defined as a subset of the plurality of CSI-RS RE groups to which the CSI-RSs for eight antenna ports are mapped. For example, in the case of four transmission antennas, the plurality of CSI-RS RE groups may be ten CSI-RS RE groups of FIG. 26 or 10 CSI-RS RE groups of FIG. 31. Alternatively, for four transmission antennas, 13 CSI-RS RE groups of FIG. 29 may be used.

The plurality of CSI-RS RE groups to which the CSI-RSs for two antenna ports are mapped may be defined as a subset of the plurality of CSI-RS RE groups to which the CSI-RSs for eight antenna ports are mapped. For example, in the case of two transmission antennas, the plurality of CSI-RS RE groups may be 20 CSI-RS RE groups of FIG. 34. Alternatively, for two transmission antennas, 26 CSI-RS RE groups of FIG. 33 may be used.

In step S3520, the base station may map CSI-RSs for eight or less antenna ports to one CSI-RS RE group selected from the plurality of CSI-RS RE groups. At this time, the CSI-RSs for two antenna ports among the CSI-RSs for eight or less antenna ports may be multiplexed using a CDM-T scheme using orthogonal codes of a length of 2 over two contiguous OFDM symbols on the same subcarrier.

In step S3530, the base station may transmit a downlink subframe to which CSI-RSs for eight or less antenna ports are mapped.

If the CSI-RSs for eight or less antenna ports are transmitted in a state of being mapped to one CSI-RS RE group selected in one subframe, the CSI-RSs for eight or less antenna ports may be mapped to a CSI-RS RE group different from the selected CSI-RS RE group in another subframe.

In step S3540, a UE may receive a downlink subframe, in which the CSI-RSs for eight or less antenna ports are mapped to one CSI-RS RE group selected from the plurality of CSI-RS RE groups defined on the data region of the downlink subframe, from the base station.

In step S3550, the UE may measure channel information for each antenna port using the CSI-RSs for eight or less antenna ports. In addition, the UE may feed back the measured channel information (CSI) to the base station.

Although the method according to one embodiment of the present invention performed by the base station and the UE is described for clarity, the above-described various embodiments of the present invention may be applied.

Figure 36:
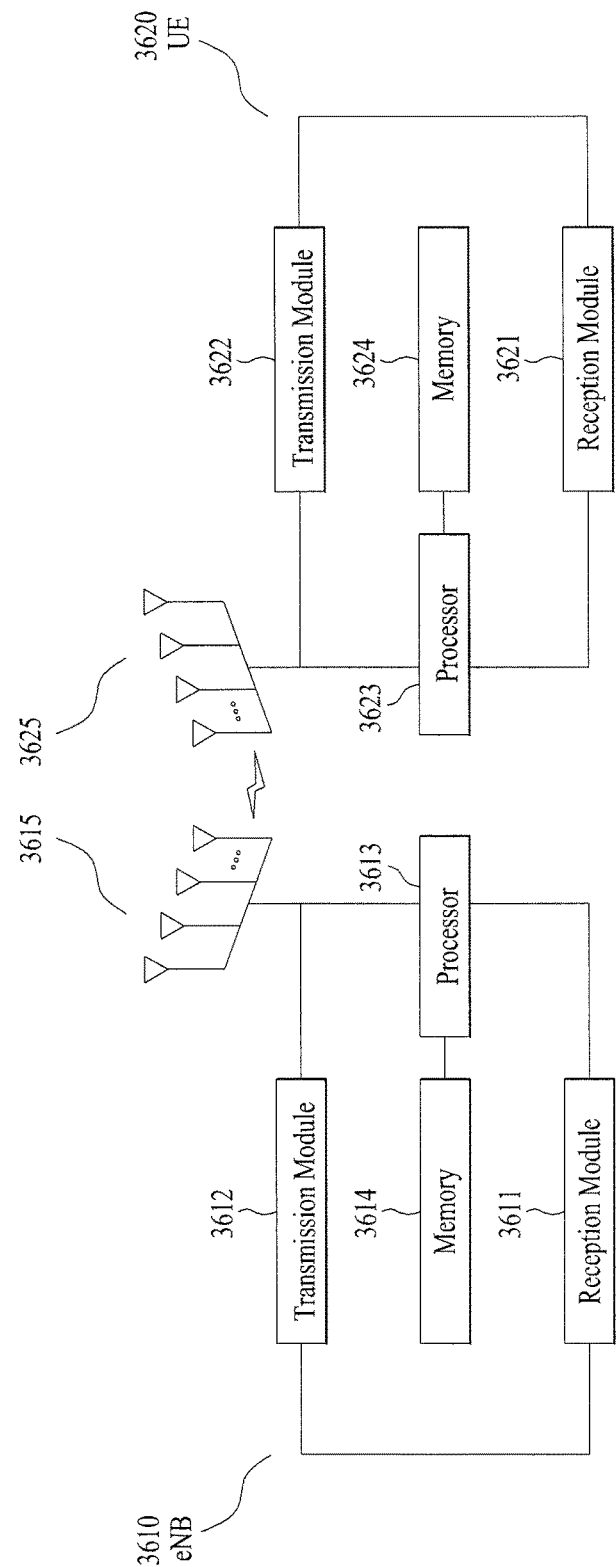
FIG. 36 is a diagram showing the configuration of a wireless communication system including a base station and a user equipment according to an exemplary embodiment of the present invention.
Figure 23:
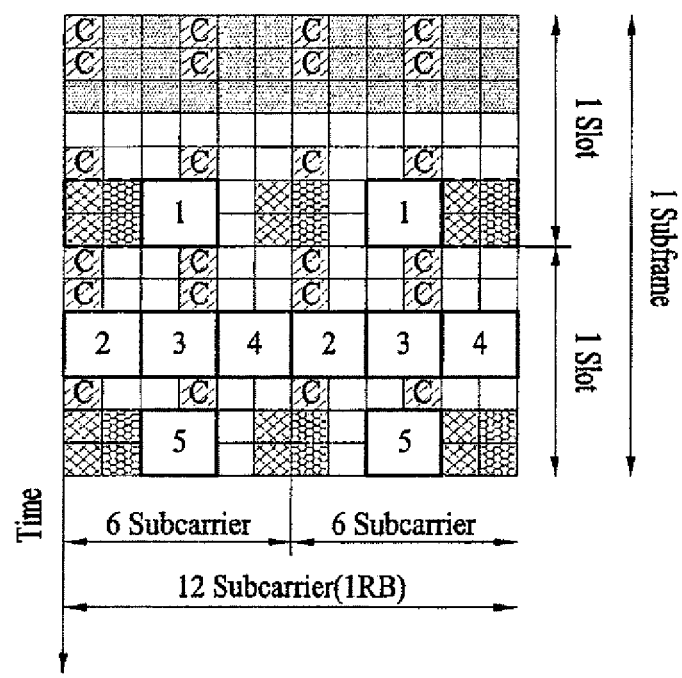

FIG. 36 is a diagram showing the configuration of a wireless communication system including a base station and a UE according to an exemplary embodiment of the present invention.

A base station (eNB) 3610 may include a reception module 3611, a transmission module 3612, a processor 3613, a memory 3614 and an antenna 3615. The reception module 3611 may receive a variety of signals, data and information from the UE. The transmission module 3612 may transmit a variety of signals, data and information to the UE. The processor 3613 may be configured to control the overall operation of the base station 3610 including the reception module 3611, the transmission module 3612, the memory 3614 and the antenna 3615. The antenna 3615 may include a plurality of antennas.

The base station 3610 according to one embodiment of the present invention may transmit CSI-RSs for eight or less antenna ports. The processor 3613 of the base station may select one of the plurality of CSI-RS RE groups defined on the data region of the downlink subframe and map the CSI-RSs for eight or less antenna ports. The processor 3613 may transmit the downlink subframe, in which the CSI-RSs for eight or less antenna ports are mapped, through the transmission module 3612. The plurality of CSI-RS RE groups may be defined such that the transmission diversity RE pair for data transmitted on the downlink subframe is not broken.

The processor 3613 performs a function for processing information received by the UE and information to be transmitted, and the memory 3614 may store the processed information for a predetermined time, and may be replaced with another component such as a buffer (not shown).

The UE 3620 may include a reception module 3621, a transmission module 3622, a processor 3623, a memory 3624 and an antenna 3625. The reception module 3621 may receive a variety of signals, data and information from the base station. The transmission module 3622 may transmit a variety of signals, data and information to the base station. The processor 3623 may be configured to control the overall operation of the UE 3620 including the reception module 3621, the transmission module 3622, the memory 3624 and the antenna 3625. The antenna 3625 may include a plurality of antennas.

The UE 3620 according to one embodiment of the present invention may measure channel information from the CSI-RSs for eight or less antenna ports. The processor 3623 of the UE may be configured to receive the downlink subframe in which the CSI-RSs for the eight or less antenna ports are mapped to one CSI-RS RE group selected from the plurality of CSI-RS RE groups defined on the data region of the downlink subframe through the reception module 3621. The processor 3623 may be configured to measure the channel information for the antenna ports using the CSI-RSs for eight or less antenna ports. The plurality of CSI-RS RE groups may be defined such that the transmission diversity RE pair for the data transmitted on the downlink subframe is not broken.

The processor 3623 performs a function for processing information received by the UE and information to be transmitted, and the memory 3624 may store the processed information for a predetermined time, and may be replaced with another component such as a buffer (not shown).

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A method for transmitting channel state information-reference signals (CSI-RSs) for eight or less antenna ports, the method comprising:
    transmitting, to a receiving end, the CSI-RSs in a downlink subframe; and
    receiving, from the receiving end, channel state information (CSI) measured based on the CSI-RSs,
    wherein the CSI-RSs are mapped to one resource element (RE) group among a plurality of RE groups, each RE group includes a plurality of REs, and each RE is defined by one subcarrier in one orthogonal frequency division multiplexing (OFDM) symbol, wherein, in a resource region defined by 14 OFDM symbols and 12 subcarriers in the downlink subframe, each of the plurality of RE groups for eight antenna ports includes:
a first RE set including four REs on two contiguous subcarriers in two contiguous OFDM symbols, and
a second RE set including another four REs on another two contiguous subcarriers in the two contiguous OFDM symbols, and
wherein the first RE set is separated from the second RE set by four subcarriers.

2. The method according to claim 1, wherein, in the resource region defined by 14 OFDM symbols and 12 subcarriers in the downlink subframe, a number of the plurality of RE groups for the eight antenna ports is five.

3. The method according to claim 1, wherein a plurality of RE groups for four antenna ports are defined as a subset of the plurality of RE groups for the eight antenna ports.

4. The method according to claim 3, wherein a plurality of RE groups for two antenna ports are defined as a subset of the plurality of RE groups for the four antenna ports.

5. The method according to claim 1, wherein one RE group is shifted with respect to another RE group in at least one of time domain and frequency domain.

6. The method according to claim 1, wherein CSI-RSs for two antenna ports among the CSI-RSs for the eight or less antenna ports are multiplexed using a code division multiplexing (CDM) scheme using orthogonal codes of a length of 2 over the two contiguous OFDM symbols on a same subcarrier.

7. A method for measuring channel state information from channel state information-reference signals (CSI-RSs) for eight or less antenna ports, the method comprising:
receiving, from a transmitting end, the CSI-RSs in a downlink subframe;
measuring the channel state information based on the CSI-RSs for the eight or less antenna ports; and
transmitting, to the transmitting end, measured channel state information,
wherein the CSI-RSs are mapped to one resource element (RE) group among a plurality of RE groups, each RE group includes a plurality of REs, and one RE is defined by one subcarrier in one orthogonal frequency division multiplexing (OFDM) symbol,
wherein, in a resource region defined by 14 OFDM symbols and 12 subcarriers in the downlink subframe, each of the plurality of RE groups for eight antenna ports includes:
a first RE set including four REs on two contiguous subcarriers in two contiguous OFDM symbols, and
a second RE set including another four REs on another two contiguous subcarriers in the two contiguous OFDM symbols, and
wherein the first RE set is separated from the second RE set by four subcarriers.

8. The method according to claim 7, wherein, in the resource region defined by 14 OFDM symbols and 12 subcarriers in the downlink subframe, a number of the plurality of RE groups for the eight antenna ports is five.

9. The method according to claim 7, wherein a plurality of RE groups for four antenna ports are defined as a subset of the plurality of RE groups for the eight antenna ports.

10. The method according to claim 9, wherein a plurality of RE groups for two antenna ports are defined as a subset of the plurality of RE groups for the four antenna ports.

11. The method according to claim 7, wherein one RE group is shifted with respect to another RE group in at least one of time domain and frequency domain.

12. The method according to claim 7, wherein CSI-RSs for two antenna ports among the CSI-RSs for the eight or less antenna ports are multiplexed using a code division multiplexing (CDM) scheme using orthogonal codes of a length of 2 over the two contiguous OFDM symbols on a same subcarrier.

13. A base station for transmitting channel state information-reference signals (CSI-RSs) for eight or less antenna ports, the base station comprising:
a reception module configured to receive an uplink signal from a user equipment;
a transmission module configured to transmit a downlink signal to the user equipment; and
a processor configured to control the base station including the reception module and the transmission module,
wherein the processor is further configured to:
transmit, to the user equipment, using the transmission module, the CSI-RSs in a downlink subframe, and
receive, from the user equipment, using the reception module, channel state information (CSI) measured based on the CSI-RSs,
wherein the CSI-RSs are mapped to one resource element (RE) group among a plurality of RE groups, each RE group includes a plurality of REs, and one RE is defined by one subcarrier in one orthogonal frequency division multiplexing (OFDM) symbol,
wherein, in a resource region defined by 14 OFDM symbols and 12 subcarriers in the downlink subframe, each of the plurality of RE groups for eight antenna ports includes:
a first RE set including four REs on two contiguous subcarriers in two contiguous OFDM symbols, and
a second RE set including another four REs on another two contiguous subcarriers in the two contiguous OFDM symbols, and
wherein the first RE set is separated from the second RE set by four subcarriers.

14. A user equipment for measuring channel information from channel state Information-Reference Signals (CSI-RSs) for eight or less antenna ports, the user equipment comprising:
a reception module configured to receive a downlink signal from a base station;
a transmission module configured to transmit an uplink signal to the base station; and
a processor configured to control the user equipment including the reception module and the transmission module,
wherein the processor is further configured to:
receive, from the base station, using the reception module, the CSI-RSs in a downlink subframe,
measure the channel state information based on the CSI-RSs for the eight or less antenna ports, and
transmit, to the base station, using the transmission module, measured channel state information,
wherein the CSI-RSs are mapped to one resource element (RE) group among a plurality of RE groups, each RE group includes a plurality of REs, and one RE is defined by one subcarrier in one orthogonal frequency division multiplexing (OFDM) symbol,
wherein, in a resource region defined by 14 OFDM symbols and 12 subcarriers in the downlink subframe, each of the plurality of RE groups for eight antenna ports includes:

a first RE set including four REs on two contiguous subcarriers in two contiguous OFDM symbols, and a second RE set including another four REs on another two contiguous subcarriers in the two contiguous OFDM symbols, and wherein the first RE set is separated from the second RE set by four subcarriers.

* * * * *

UNITED STATES PATENT AND TRADEMARK OFFICE
CERTIFICATE OF CORRECTION

PATENT NO. : 9,577,806 B2
APPLICATION NO. : 15/099423
DATED : February 21, 2017
INVENTOR(S) : Dae Won Lee et al.

It is certified that error appears in the above-identified patent and that said Letters Patent is hereby corrected as shown below:

In the Drawings

At Sheet 23 of 36, replace Fig. 23 with the corrected Fig. 23 attached hereto.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*

Control Region
CRS for 4 Transmission Antennas
DMRS ( Layer 1, 2, 5, 7 )
DMRS ( Layer 3, 4, 6, 8 )
CSI-RS RE Group For 8 CSI-RSs